US012145830B2

(12) United States Patent
Fantappie et al.

(10) Patent No.: US 12,145,830 B2
(45) Date of Patent: Nov. 19, 2024

(54) CHILLER FOR COOLING A BEVERAGE

(71) Applicant: PepsiCo, Inc., Purchase, NY (US)

(72) Inventors: Giancarlo Fantappie, Rancho Palos Verdes, CA (US); Francesco Campisano, Pisa (IT); Paolo DiMarco, Pisa (IT); Steven T. Jersey, Laguna Niguel, CA (US)

(73) Assignee: PepsiCo, Inc., Purchase, NY (US)

( * ) Notice: Subject to any disclaimer, the term of this patent is extended or adjusted under 35 U.S.C. 154(b) by 0 days.

(21) Appl. No.: 17/339,545

(22) Filed: Jun. 4, 2021

(65) Prior Publication Data

US 2021/0380390 A1 Dec. 9, 2021

Related U.S. Application Data

(60) Provisional application No. 63/035,136, filed on Jun. 5, 2020.

(51) Int. Cl.

*B67D 1/08* (2006.01)
*F25D 16/00* (2006.01)
*F25D 31/00* (2006.01)

(52) U.S. Cl.

CPC ........... *B67D 1/0864* (2013.01); *F25D 16/00* (2013.01); *F25D 31/003* (2013.01); *B67D 2210/00104* (2013.01); *F25D 2400/28* (2013.01)

(58) Field of Classification Search

CPC ........ B67D 1/0864; B67D 2210/00104; B67D 1/0888; F25D 16/00; F25D 31/003; F25D 2400/28; F28D 2021/0042; F28D 1/0213; F28D 1/0226; F28D 1/0472; F28D 7/022; F28D 7/10

See application file for complete search history.

(56) References Cited

U.S. PATENT DOCUMENTS 2,752,763 A * 4/1954 Shepard ................ F25D 31/003 62/59
3,415,316 A * 12/1968 Burne et al. .............. F28D 7/10 165/164

(Continued)

FOREIGN PATENT DOCUMENTS

KR 20070105224 A * 10/2007 ............... F28D 7/10

OTHER PUBLICATIONS

KR 20070105224 A Translation (Year: 2007).*

(Continued)

*Primary Examiner* — Elizabeth J Martin
*Assistant Examiner* — Dario Antonio DeLeon
(74) *Attorney, Agent, or Firm* — Sterne, Kessler, Goldstein & Fox P.L.L.C.

(57) ABSTRACT

A chiller for cooling a beverage includes a reservoir configured to hold a heat exchange fluid and an evaporator coil arranged within the reservoir. The evaporator coil includes a plurality of windings configured to circulate a coolant, and projections extending from an exterior surface of one or more of the plurality of windings. The chiller further includes a chiller coil arranged in the reservoir, wherein the beverage is configured to flow through the chiller coil. When the coolant is circulated through the plurality of windings of the evaporator coil, a bank of frozen heat exchange fluid forms on the windings and on the projections.

16 Claims, 27 Drawing Sheets

(56) References Cited

U.S. PATENT DOCUMENTS

| | | | | |
|---|---|---|---|---|
| 3,892,335 | A * | 7/1975 | Schroeder ............. | F25D 31/003 222/129 |
| 4,036,621 | A * | 7/1977 | Burton .................... | F28D 7/024 62/394 |
| 4,949,552 | A | 8/1990 | Adams | |
| 5,363,671 | A | 11/1994 | Forsythe et al. | |
| 2004/0074144 | A1* | 4/2004 | Kubo et al. ........... | F28D 1/0213 48/174 |
| 2010/0155037 | A1 | 6/2010 | Grimm et al. | |
| 2015/0007962 | A1 | 1/2015 | Yoon | |
| 2018/0362320 | A1* | 12/2018 | Wong ................... | B67D 1/0406 |
| 2021/0123670 | A1* | 4/2021 | Kim et al. ........... | B67D 1/0864 |

OTHER PUBLICATIONS

International Search Report and Written Opinion of the International Searching Authority in International Application No. PCT/US2021/035979, mailed Sep. 9, 2021 (9 pages).
Extended European Search Report issued in counterpart European Application No. 21817653.5, mailed May 15, 2024 (10 pages).

* cited by examiner

CHILLER FOR COOLING A BEVERAGE

FIELD

Embodiments described herein generally relate to a chiller for cooling a beverage that has a compact size. Specifically, embodiments described herein relate to a chiller that includes one or more chiller coils through which a beverage flows and an evaporator coil for circulating a coolant that includes projections for facilitating heat transfer from the chiller coils to the evaporator coil.

BACKGROUND

Chillers are used to cool and dispense a beverage. Some chillers operate by cooling a quantity of a beverage in a reservoir prior to dispensing the beverage. When a consumer desires a beverage, a portion of the pre-cooled beverage is simply dispensed from the reservoir.

Chillers that require a reservoir for storing pre-cooled beverages have several drawbacks. The reservoir consumes substantial space, increasing the size of the chiller. This may be undesirable when providing a chiller for a home or office setting. Further, cooling the quantity of beverage within the reservoir may take an extended period of time. Once the stored quantity of pre-cooled beverage is dispensed, the consumer must wait for a period of time until a new batch of the beverage is cooled.

Accordingly, there is a need in the art for a chiller that has a small form factor and that can rapidly chill a beverage in seconds and dispense the chilled beverage on a continuous basis.

BRIEF SUMMARY OF THE INVENTION

Some embodiments described herein relate to a chiller for cooling a beverage, wherein the chiller includes a reservoir configured to hold a heat exchange fluid, and an evaporator coil arranged within the reservoir. The evaporator coil of the chiller includes a plurality of windings configured to circulate a coolant, and projections extending from an exterior surface of one or more of the plurality of windings. The chiller further includes a chiller coil arranged in the reservoir, wherein the beverage is configured to flow through the chiller coil, and wherein when the coolant is circulated through the plurality of windings of the evaporator coil, a bank of frozen heat exchange fluid forms on the plurality of windings and on the projections.

In any of the various embodiments described herein, the projections may include one or more fins.

In any of the various embodiments described herein, the projections may include one or more rods.

In any of the various embodiments described herein, the projections may include a lattice structure.

In any of the various embodiments described herein, the evaporator coil may be formed from a first material, and the projections may be formed from a second material, and the first material may be the same as the second material.

In any of the various embodiments described herein, the evaporator coil may define a central volume, and the chiller coil may be arranged within the central volume of the evaporator coil.

In any of the various embodiments described herein, the chiller may further include a second chiller coil arranged in the reservoir, wherein the beverage is configured to flow through the second chiller coil. In some embodiments, the chiller may further include a splitter configured to divide a flow of the beverage to the first chiller coil and to the second chiller coil, wherein the splitter divides the flow of the beverage such that a greater portion of the beverage flows to the first chiller coil than to the second chiller coil.

In any of the various embodiments described herein, a wall thickness of the chiller coil may be in a range of about 0.2 mm to about 1.0 mm.

In any of the various embodiments described herein, the reservoir of the chiller may have a total volume of about 3 L to about 10 L.

In any of the various embodiments described herein, the chiller further includes an agitator arranged in the reservoir, wherein the agitator may include an impeller having one or more blades. In some embodiments, the chiller further includes a temperature sensor configured to determine a temperature of the chiller coil, wherein the agitator is configured to operate when a temperature of the chiller coil as detected by the temperature sensor is in a predetermined temperature band.

Some embodiments described herein relate to a beverage dispenser that includes a user interface configured to receive a selection of a beverage and a chiller configured to cool a beverage. The chiller of the beverage dispenser includes a reservoir configured to store a heat exchange fluid, an evaporator coil arranged within the reservoir and configured to circulate a coolant, wherein the evaporator coil includes a plurality of windings and projections extending from an exterior surface of one or more of the plurality of windings of the evaporator coil. The chiller of the beverage dispenser further includes a chiller coil arranged within the reservoir, wherein the beverage flows through the chiller coil such that the beverage is cooled as the beverage flows through the chiller coil, and wherein when the coolant is circulated through the evaporator coil, a bank of frozen heat exchange fluid forms on the evaporator coil and on the projections. The beverage dispenser further includes a dispensing nozzle in communication with the chiller coil for dispensing the beverage.

In any of the various embodiments described herein, the beverage dispenser may further include a cooling system configured to circulate the coolant, and the cooling system may include the evaporator coil.

In any of the various embodiments described herein, the beverage dispenser may further include a carbonator configured to carbonate the beverage, wherein the carbonator is in communication with the chiller coil.

Some embodiments described herein relate to a chiller for cooling a beverage that includes a reservoir, and a heat exchange fluid stored within the reservoir, wherein the heat exchange fluid is an ionic liquid having a freezing point about 0° C. The chiller further includes an evaporator coil arranged within the reservoir, the evaporator coil including a plurality of windings configured to circulate a coolant, and projections extending from an exterior surface of one or more of the plurality of windings. The chiller further includes a chiller coil arranged in the reservoir, wherein the beverage flows through the chiller coil, and wherein when the coolant is circulated through the windings of the evaporator coil, at least a portion of the heat exchange fluid freezes into a solid phase.

In any of the various embodiments described herein, the heat exchange fluid may have a freezing point between about 0.01° C. and about 5° C.

In any of the various embodiments described herein, the ionic liquid may be selected from the group of 1-butyl-3-methylimidazolium based ionic liquids, imidazolium based ionic liquids, pyridinium based ionic liquids, and morpholine based ionic liquids.

In any of the various embodiments described herein, the ionic liquid may have a latent heat of fusion in a range of about 200 kJ/kg to about 300 kJ/kg.

In any of the various embodiments described herein having an ionic liquid, when the coolant is circulated through the windings of the evaporator coil, all of the heat exchange fluid may freeze into a solid phase.

BRIEF DESCRIPTION OF THE DRAWINGS/FIGURES

The accompanying drawings, which are incorporated herein and form a part of the specification, illustrate the present disclosure and, together with the description, further serve to explain the principles thereof and to enable a person skilled in the pertinent art to make and use the same.

DETAILED DESCRIPTION

Figure 1:
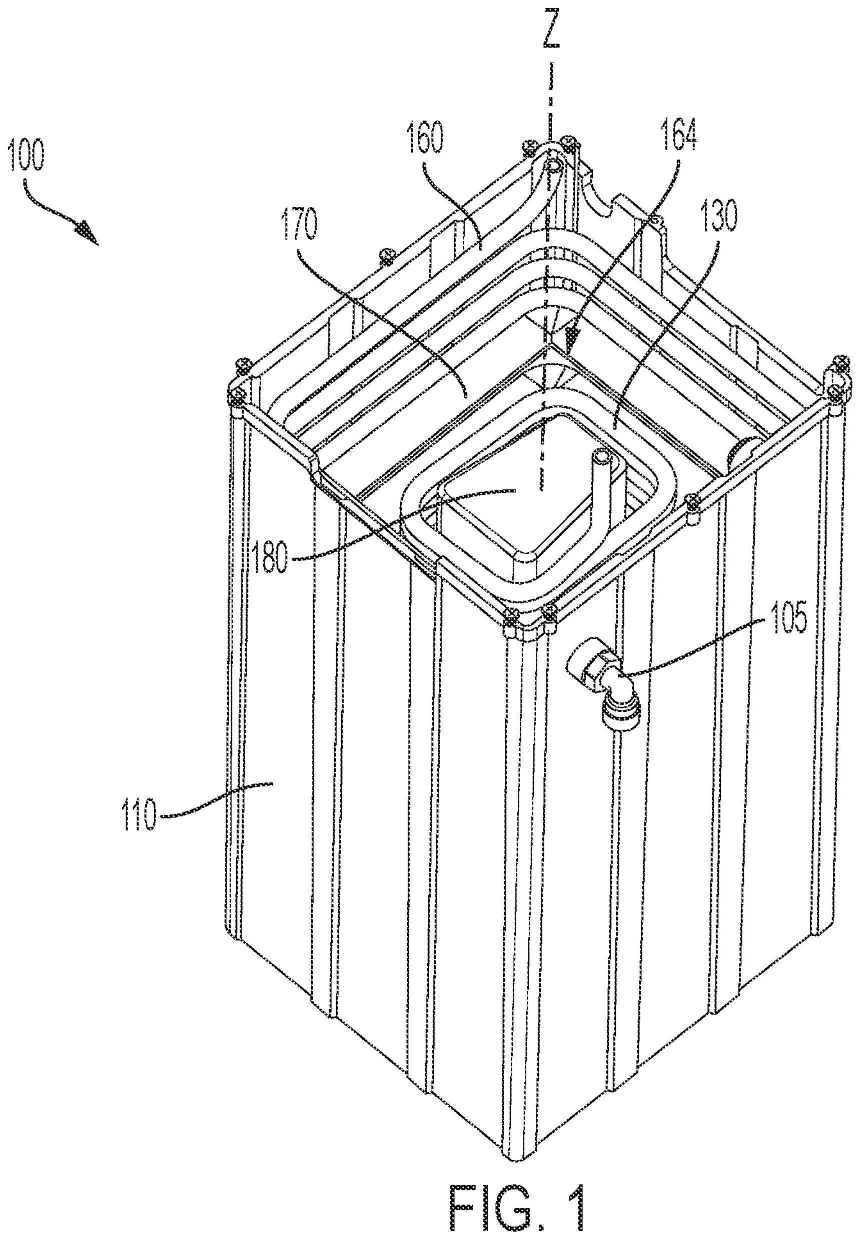
FIG. 1 shows a perspective view of a chiller according to an embodiment, wherein an upper end of the reservoir of the chiller is removed.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the claims.

There is an increasing demand for in-home or in-office beverage chillers. In order to provide a chiller for home or office use, the chiller must have a small form factor so that the chiller can be installed on a countertop, such as a kitchen counter. Chillers having a reservoir of pre-cooled beverage, such as carbonated or non-carbonated water, are typically large and are impractical for use in home or office settings.

The footprint of the chiller can be greatly reduced if the reservoir of the pre-cooled beverage is eliminated and instead the beverage is chilled on-demand, i.e., as the beverage is being dispensed. A beverage can be cooled very rapidly and on-demand by passing a beverage through a coil arranged in a reservoir containing a heat exchange fluid, such as water, to remove the heat from the beverage as the beverage passes through the coil. Some chillers may use heat exchange fluid to cool a beverage, but may rely on large reservoirs of 20 L of heat exchange fluid or more. As a result, beverage dispensers that use such chillers are not practical for home or office settings, and are instead used in commercial kitchens, such as in restaurants or bars. Thus, to maintain a small footprint, the beverage dispenser chiller must use a small chiller reservoir for storing the heat exchange fluid.

However, cooling a quantity of liquid to a desired temperature, such as 5° C. or less, in an on-demand basis and with a relatively small quantity of heat exchange fluid presents numerous design and engineering challenges, particularly as larger volumes of beverage or higher flow rates of beverage are desired to be dispensed. Further, as the solubilization of carbon dioxide decreases significantly with increasing temperature, a carbonated beverage has to be chilled to 5° C. or less to maintain sufficient carbonation for carbonated beverages and to avoid excessive foaming.

The heat exchange in the chiller must be sufficient to cool the beverage in a few seconds as the beverage flows through the chiller, and the chiller must be sufficient to cool large volumes of the beverage. A chiller can be rated by its compact ratio coefficient which may refer to the ratio of the maximum cold water volume that can be dispensed at or below 5° C. in one hour to the volume of the chiller. Thus, it is desired to produce a chiller having a high compact ratio coefficient, indicating that the volume of liquid that can be dispensed at or below 5° C. in one hour is large relative to the volume of the chiller.

The inventors of the present application found that the compact ratio coefficient can be increased by maximizing heat exchange within the chiller. By increasing heat exchange efficiency, a chiller can be designed with a smaller footprint while producing the same volume of chilled beverage, or alternatively the volume of chilled beverage that can be dispensed can be increased without increasing the size of the chiller.

Some embodiments described herein relate to a chiller that includes an evaporator coil having projections such that a bank of frozen heat exchange fluid can be formed on the evaporator coil and additionally on the projections. In this way, the surface area of the bank of frozen heat exchange fluid may be increased relative to a bank of frozen heat exchange fluid formed on the evaporator coil alone. The increased surface area of the bank of frozen heat exchange fluid may increase heat transfer between the evaporator coil and chiller coil to promote cooling of the beverage in the chiller coil. Some embodiments described herein relate to a chiller that includes an evaporator coil having projections with a reticular structure that facilitates formation of the frozen bank of heat exchange fluid on the projections. The reticular structure of the projections increases the thermal conductivity of the bank of frozen heat exchange fluid, allowing the bank of frozen heat exchange fluid to form more rapidly.

As used herein, the term "beverage" may refer to any of various consumable liquids, including but not limited to carbonated water, non-carbonated water (e.g., still water), flavored or enhanced waters, juice, coffee or tea-based beverages, sports drinks, energy drinks, sodas, dairy or dairy-based beverages (e.g., milk), among others.

As used herein, the term "coolant" may refer to any fluid configured to reduce the temperature of the heat exchange fluid, such as a refrigerant, particularly a refrigerant with low global warming potential (GWP) and/or ozone depletion potential (ODP), including among others, R600a, R134a, R290, R744, R32, and mixtures thereof, such as a mixture of R290/R744.

As used herein, the term "heat exchange fluid" may refer to a substance configured to drive an exchange of heat from a liquid within the chiller coil, such as a beverage. For example, the heat exchange fluid may include water that may vary in total dissolved solids and/or pH to impact melting conditions and ice structure, a water and alcohol mixture, or ionic liquids, among others.

In some embodiments, a chiller as described herein may be configured to lower the temperature of a beverage by 20° C. or more. The chiller may be configured to lower the temperature of a beverage from ambient temperature, e.g., about 25° C., to 5° C. or less in 10 seconds or less, in 8 seconds or less, or in 4 seconds or less. In some embodiments, when chiller is initially started, a bank of frozen heat exchange fluid may form within the reservoir of the chiller in 80 minutes or less, 60 minutes or less, or 40 minutes or less. In this way, the chiller has a rapid start-up time and can begin cooling beverages shortly after start-up. Further, the chiller can quickly regenerate the bank of frozen heat exchange fluid when depleted.

Some embodiments herein are directed to a chiller 100 that includes a reservoir 110 configured to hold a heat exchange fluid, as shown in FIG. 1. An evaporator coil 160 is arranged within reservoir 110 and is part of a cooling system for circulating a coolant. A chiller coil 130 connected to a source of beverage is arranged within reservoir 110 and within a central volume 164 of evaporator coil 160. Chiller coil 130 is configured to cool the beverage and communicate the beverage to a dispenser 105. Dispenser 105 may be arranged on reservoir 110 or may be remote from reservoir 110 and connected thereto via a conduit. An agitator or pump 180 may be arranged within reservoir 110 and is configured to circulate heat exchange fluid within reservoir 110. In operation, a bank of frozen heat exchange fluid (e.g., an ice bank when the heat exchange fluid is water) forms around evaporator coil 160 for absorbing heat from the beverage in chiller coil 130. To increase heat exchange, evaporator coil 160 may include one or more projections 170 around which the bank forms, as discussed in further detail herein.

Reservoir 110 is configured to hold a heat exchange fluid that facilitates heat transfer between a beverage flowing through chiller coil 130 and evaporator coil 160 of chiller 100. In some embodiments, the heat exchange fluid may be water. The use of water as the heat exchange fluid may facilitate maintenance of chiller 100, as water is non-toxic and can be easily drained and replaced by the end user.

In some embodiments, reservoir 110 of chiller 100 may have a total interior volume of about 3 L to about 10 L. Reservoir 110 may be configured to hold about 2 L to about 9 L of heat exchange fluid, about 2.5 L to about 8 L of heat exchange fluid, or about 3 L to about 7 L of heat exchange fluid. As the total size of chiller 100 depends largely on the size of reservoir 110, the use of a small reservoir 110 and a small quantity of heat exchange fluid allows chiller 100 to have a compact form factor, suitable for use in a home or office setting, such as on a kitchen countertop, under a kitchen sink, or built-into a kitchen cabinet.

Reservoir 110 of chiller 100 may have any of various shapes, and may be shaped as a rectangular prism, a cube, or a cylinder, among others. Reservoir 110 may be thermally insulated so as to inhibit or minimize transfer of heat external to chiller 100 into chiller 100. Reservoir 110 may include a lid that provides access to an interior volume of reservoir 110, such as for filling or replacing heat exchange fluid or performing maintenance or repair of components within reservoir 110. However, in some embodiments, reservoir 110 may be sealed so that the interior volume of reservoir 110 is not accessible by the end user.

Figure 2:
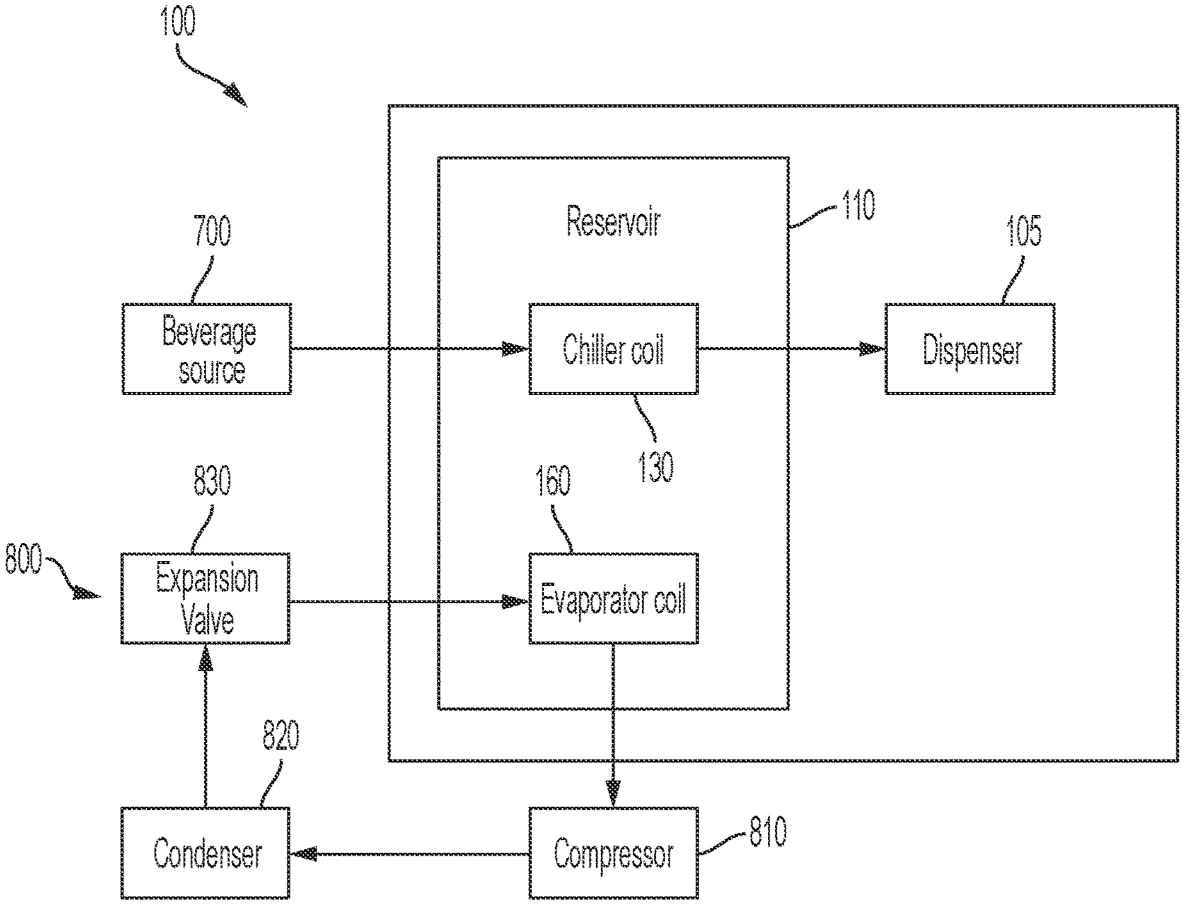
FIG. 2 shows a schematic diagram of the components of a chiller and a cooling system according to an embodiment.

The components of a chiller 100 according to some embodiments are shown in FIG. 2. Chiller 100 may include a reservoir 110 in which a chiller coil 130 and an evaporator coil 160 are arranged. Chiller coil 130 and evaporator coil 160 may be arranged in a nested configuration, and may be at least partially submerged in a heat exchange fluid within reservoir 110. A beverage source 700 remote from chiller 100 may be in communication with chiller coil 130, such as by a conduit, to supply a beverage to chiller coil 130. Beverage source 700 may be, for example, a municipal water supply, a well, or a reservoir of a beverage. Chiller 100 may include a dispenser 105, such as a dispensing nozzle, in communication with chiller coil 130 for dispensing the cooled beverage that flowed through chiller coil 130. When dispenser 105 is actuated, beverage flows from beverage source 700 through chiller coil 130 and the beverage is chilled as it flows through chiller coil 130 so that the beverage is cooled (e.g., to 5° C. or less) when dispensed via dispenser 105. Thus, the beverage is chilled in an on-demand fashion, which may also referred to as continuous chilling.

Evaporator coil 160 of chiller 100 is configured to circulate a coolant as part of a cooling system 800. Cooling system 800 may be a vapor-compression cooling system and may include, in addition to an evaporator coil 160, a compressor 810, a condenser 820, and an expansion valve 830, as will be appreciated by one of ordinary skill in the art. As coolant flows through evaporator coil 160 changing in phase from liquid to vapor, heat exchange fluid surrounding evaporator coil 160 freezes, forming a bank of frozen heat exchange fluid (see, e.g., FIG. 3). Heat from the beverage flowing through chiller coil 130 is transferred and absorbed by the bank of frozen heat exchange fluid, so that beverage is chilled. The bank of frozen heat exchange fluid has a high latent heat of fusion such that a considerable amount of heat can be absorbed without a corresponding change in temperature of the heat exchange fluid.

Figure 3:
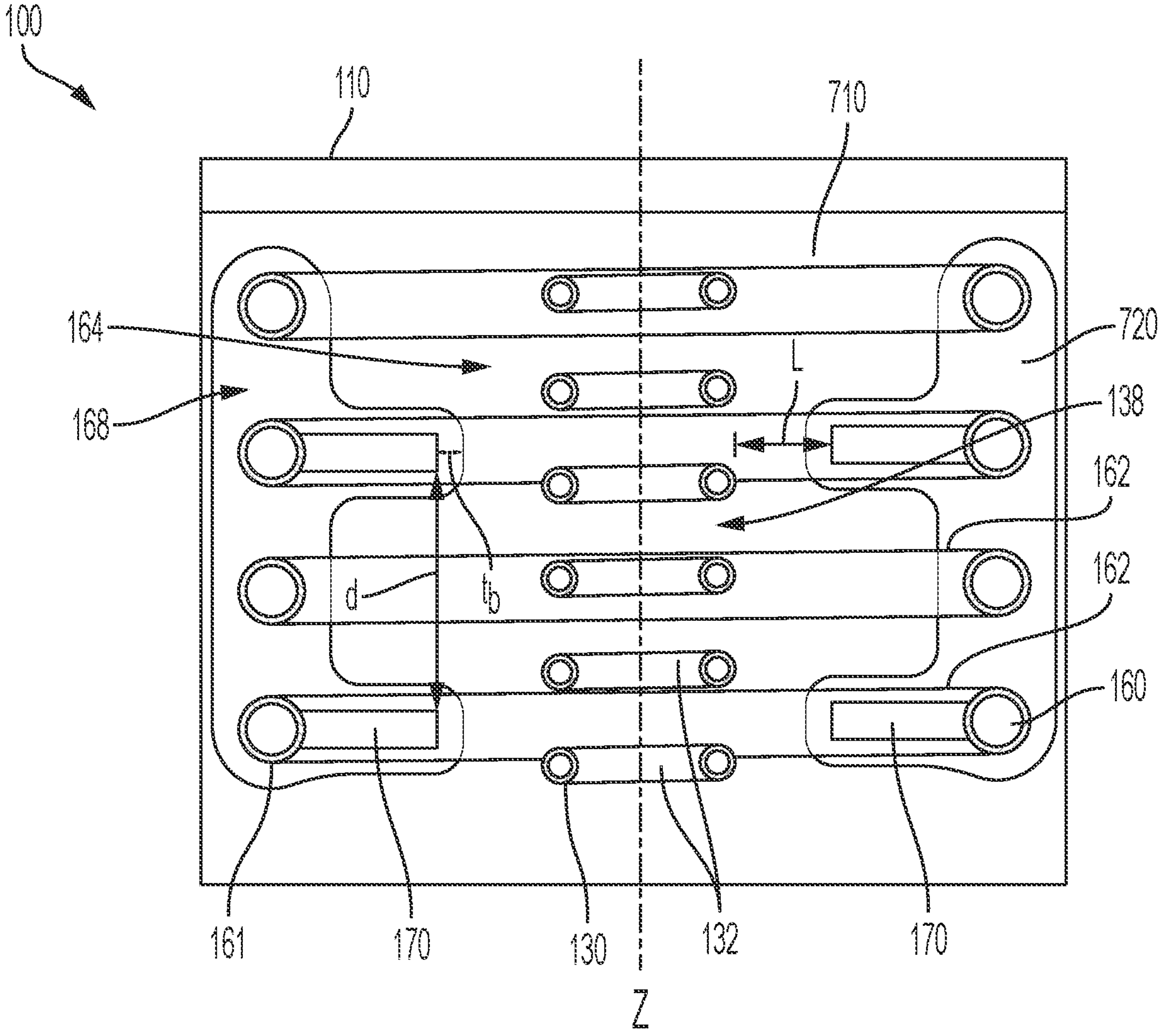
FIG. 3 shows a schematic cross sectional view of a chiller according to an embodiment.

In some embodiments, evaporator coil 160 may be a tube having a plurality of windings 162 arranged in a stacked configuration as shown for example in FIG. 3. Each winding 162 may have a rectangular configuration when viewed in a top-down manner (see, e.g., FIG. 4). However, in some embodiments, each winding 162 may have a square, circular, or elliptical configuration when viewed in a top-down manner. Windings 162 may extend around a central axis Z of evaporator coil 160. Windings 162 may be in contact with one another or may be separated by a space 168. Evaporator coil 160 may follow an internal perimeter 112 of reservoir 110. In some embodiments, evaporator coil 160 may have a shape corresponding to a shape of reservoir 110. For example, if reservoir 110 has a substantially rectangular configuration, evaporator coil 160 may have a rectangular configuration so as to follow the shape of perimeter 112 of reservoir 110. In another example, if reservoir 110 has a substantially cylindrical shape (with a circular cross section), evaporator coil 160 may similarly have a circular shape. Evaporator coil 160 defines a central volume 164 external to evaporator coil 160. Evaporator coil 160 may be formed from a material having a high thermal conductivity. In some embodiments, evaporator coil 160 may be formed from a metal, such as copper.

Figure 4:
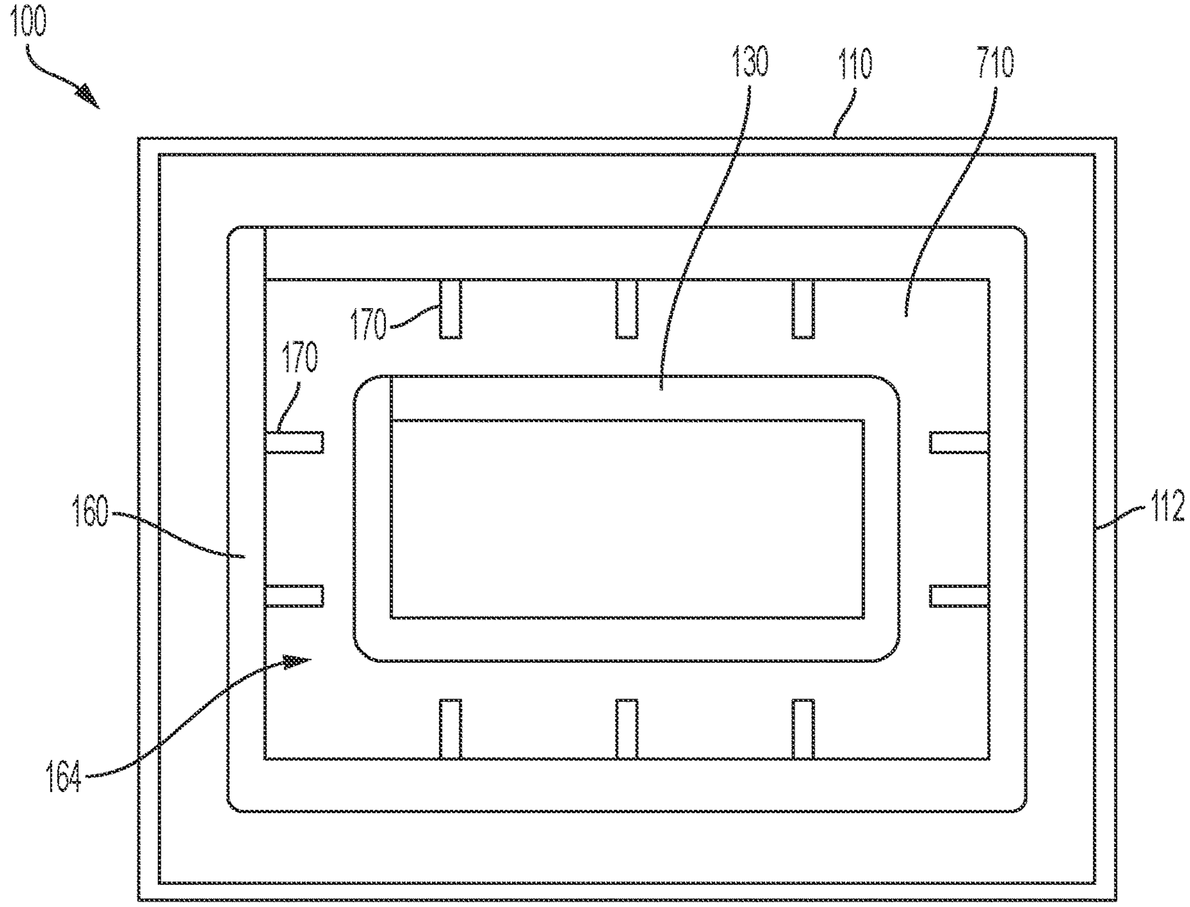
FIG. 4 shows a top down view of the chiller according to FIG. 3.

A chiller coil 130 may be arranged within reservoir 110 of chiller 100. Chiller coil 130 may be arranged in a nested configuration with evaporator coil 160. As shown in FIGS. 3 and 4, chiller coil 130 may be arranged within a central volume 164 defined by evaporator coil 160. Thus, evaporator coil 160 may at least partially surround chiller coil 130. Chiller coil 130 may be a tube having a plurality of windings 132 arranged in a stacked configuration. Windings 132 may be in contact with one another or may be separated by a space 138. Windings 132 may have a shape corresponding to a shape of reservoir 110 or corresponding to a shape of evaporator coil 160. Thus, if reservoir 110 has a rectangular configuration, each winding 132 may have a rectangular configuration when viewed in a top-down manner (see, e.g., FIG. 4). However, in some embodiments, windings 132 may have a square, circular, or elliptical configuration, among others, when viewed in a top-down manner. In some embodiments, windings 132 may not all have the same shape. Windings 132 of chiller coil 130 may extend around a central axis. In some embodiments a central axis of chiller coil 130 may be the same as the central axis of evaporator coil 160 (e.g., axis Z), such that evaporator coil 160 and chiller coil 130 are arranged concentrically. Chiller coil 130 may be formed of a metal, such as stainless steel, to inhibit corrosion, reduce scale buildup and prevent or minimize contamination of beverage in chiller coil 130.

In some embodiments, evaporator coil 160 includes one or more projections 170 extending from an exterior surface 161 of evaporator coil 160. Projections 170 may extend from evaporator coil 160 in a direction toward chiller coil 130, as shown in FIG. 4. In some embodiments, projections 170 may extend inwardly into central volume 164 of evaporator coil 160. Coolant within evaporator coil 160 does not flow into or through projections 170. Bank of frozen heat exchange fluid 720, referred to herein simply as a "bank," forms on windings 152 of evaporator coil 160 and also on projections 170. Thus, projections 170 help to increase a total surface area of bank 720 to promote heat exchange with chiller coil 130 (and the beverage flowing through chiller coil 130).

In operation of chiller 100, coolant flows through evaporator coil 160 and evaporates, causing heat exchange fluid 710 surrounding evaporator coil 160 to freeze and form a bank 720 of frozen or solid-phase heat exchange fluid (see, e.g., FIG. 3). Bank 720 may have a thickness, $t_b$, around evaporator coil 160 and projections 170. Evaporator coil 160 and projections 170 are spaced from chiller coil 130 by a distance, L, so that bank 720 does not reach chiller coil 130. Thus, L is greater than $t_b$. If chiller coil 130 is too close to evaporator coil 160, beverage flowing through chiller coil 130 may freeze, preventing the flow of beverage through chiller coil 130. Further, in order to maximize the interface between the heat exchange fluid in its solid and liquid states, space is provided between adjacent projections 170. Projections 170 may be spaced by a distance, d, wherein the distance between projections 170 may be greater than $2t_b$.

Figure 5:
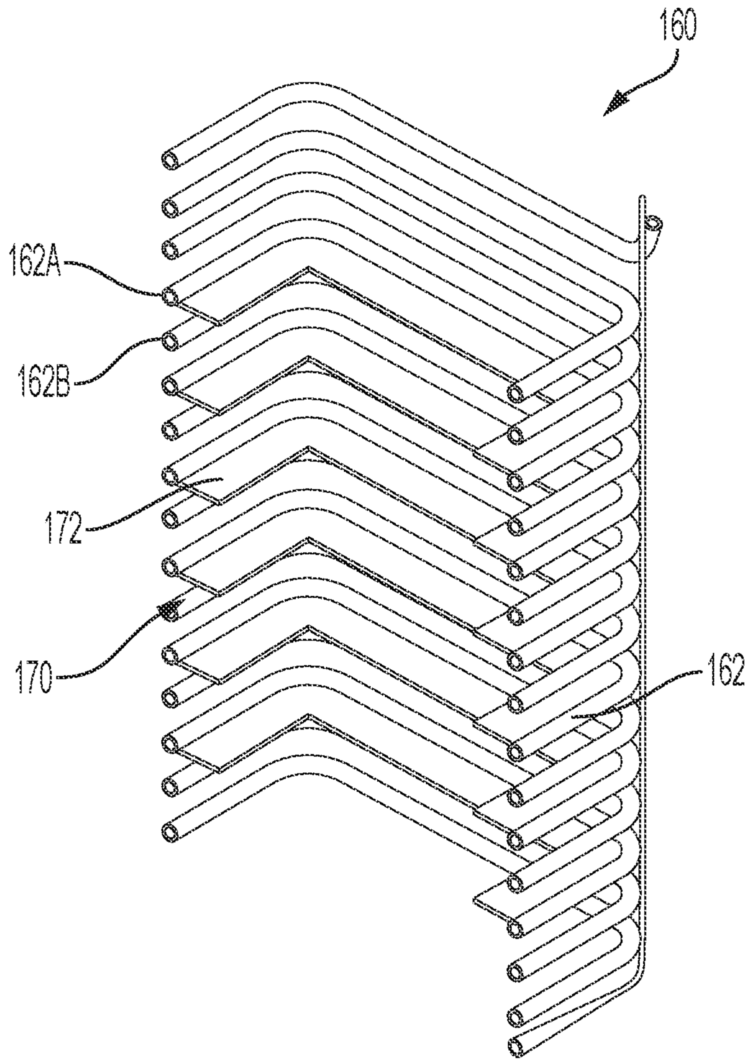
FIG. 5 shows a sectional view of an evaporator coil for a chiller that includes projections according to an embodiment.
Figure 6:
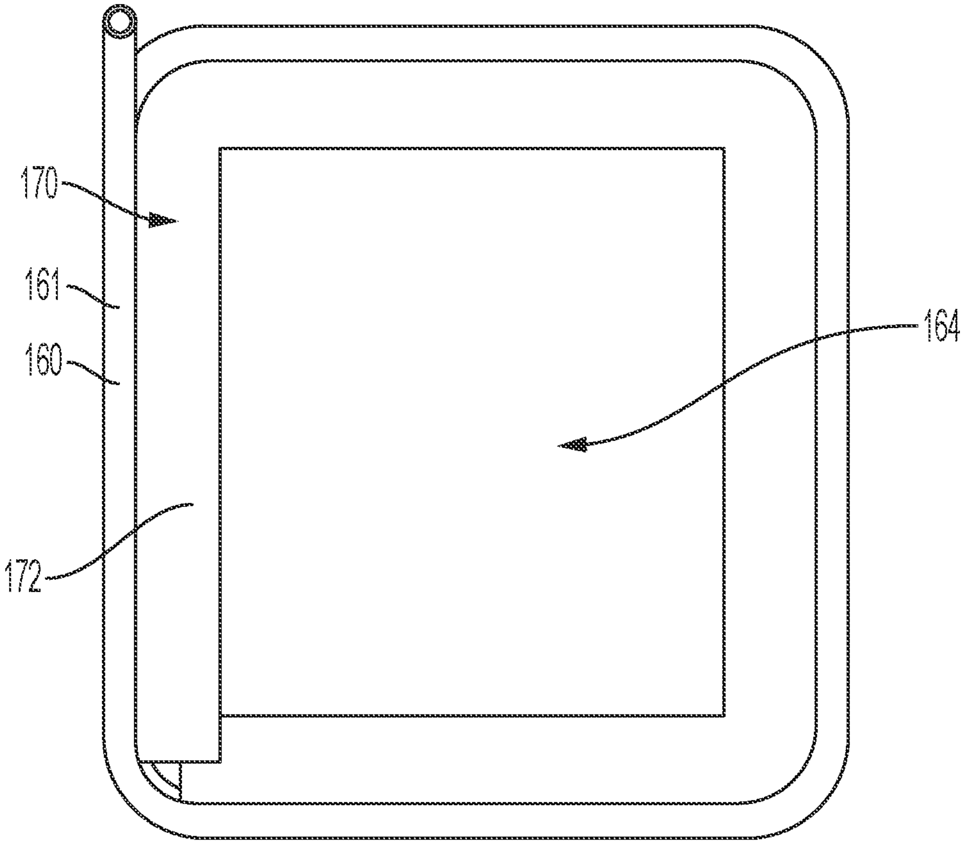
FIG. 6 shows a top-down view of an evaporator coil for a chiller that includes projections according to an embodiment.

In some embodiments, projections may be formed as fins 172, as shown in FIGS. 5 and 6. Fins 172 may be substantially planar. Fins 172 may have a generally rectangular shape. Fins 172 may extend along at least a portion of evaporator coil 160. As shown in FIG. 5, fin 172 extends along a portion of one or more windings 162 of evaporator coil 160. Fins 172 may follow a contour of windings 162 so as to extend around corners or curved portions of evaporator coil 160. Fins 172 may not be present on all windings 162 so as to allow for a space between fins 172. Fins 172 are spaced so that bank 720 does not fully fill space between fins 172. In some embodiments, fins 172 may be arranged on alternating windings 162. For example, a first winding 162A of evaporator coil 160 may have a fin 172 and a second winding 162B adjacent to first winding 162A may not have a fin. In another example, every third winding may include a fin 172. In some embodiments, each fin 172 may have a thickness of about 1 mm to about 12 mm, or about 2 mm to about 8 mm, or about 3 mm to about 5 mm.

Figure 7:
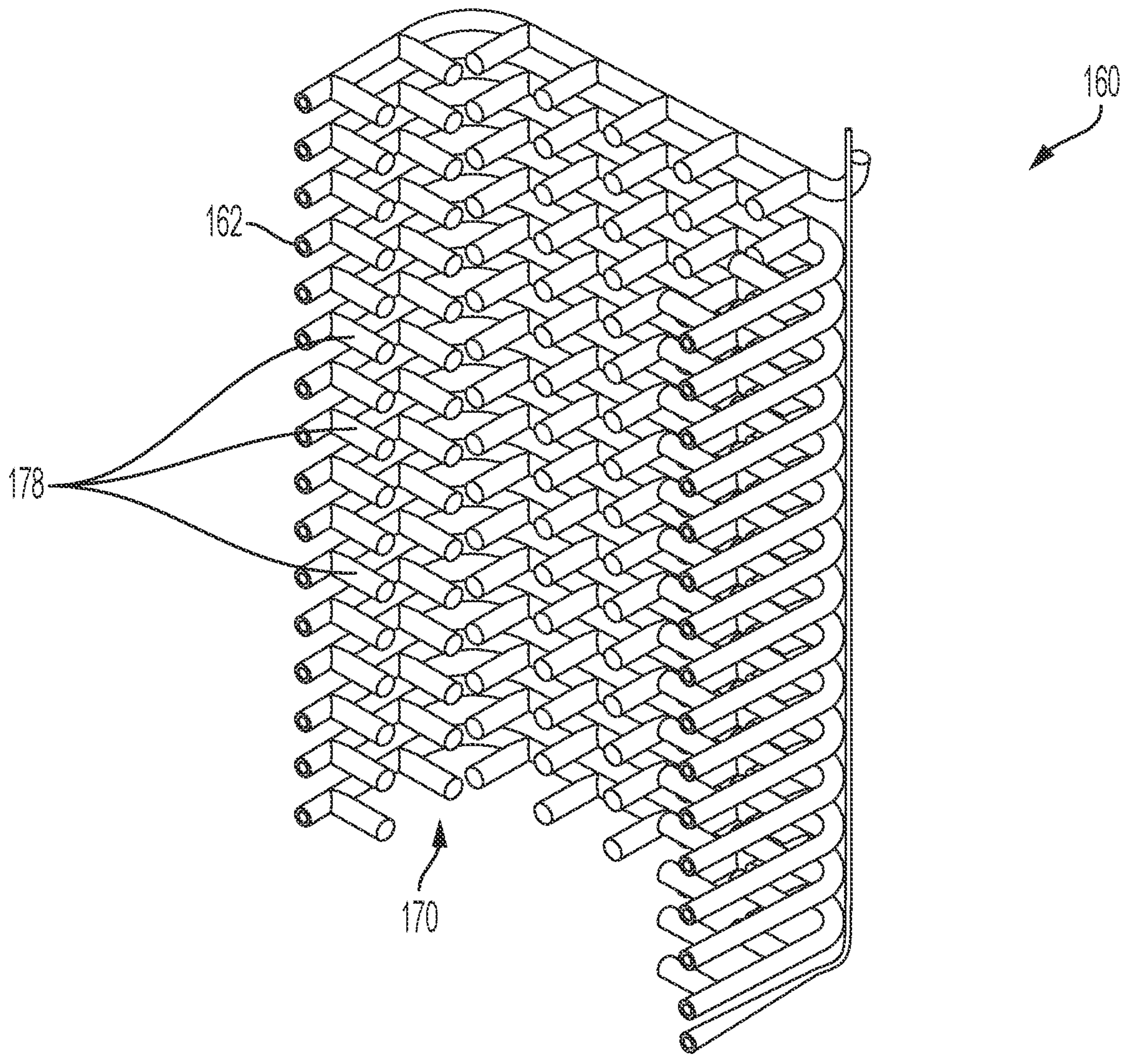
FIG. 7 shows a sectional view of an evaporator coil for a chiller that includes projections according to an embodiment.
Figure 8:
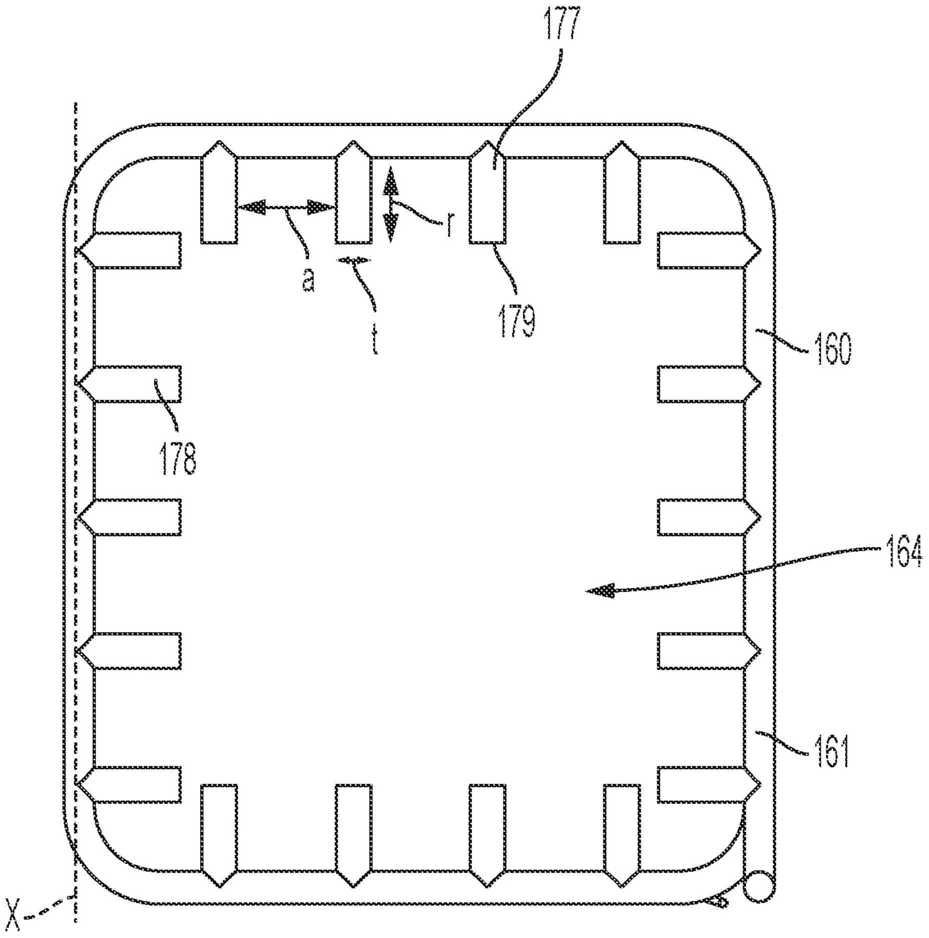
FIG. 8 shows a top-down view of an evaporator coil for a chiller that includes projections according to an embodiment.

In some embodiments, evaporator coil 160 may include projections 170 formed as rods 178, as shown for example in FIGS. 7 and 8. Rods 178 may extend generally perpendicularly to a direction of flow through evaporator coil 160, and may extend generally perpendicularly to an axis X of evaporator coil 160, as best shown in FIG. 8. A first end 177 of rod 178 may be connected to exterior surface 161 of evaporator coil 160, and rod 178 may terminate at a second end 179 opposite first end 177. Rods 178 may have a length, r, as measured from first end 177 to second end 179. Rod 178 has a thickness, t, measured as a widest dimension of rod 178 in a direction transverse to the length. Rods 178 may be spaced from one another at an interval, a. Rods 178 are spaced so that when a bank of frozen heat exchange fluid forms on evaporator coil 160 and rods 178, space between rods 178 is not completely filled by the bank of frozen heat exchange fluid. Rods 178 may each be the same size and dimensions. In some embodiments, rods 178 may be generally linear along a length of the rod 178. In some embodiments, rods 178 may be generally parallel to one another. In some embodiments, rods 178 may have a cylindrical shape, a cone shape, or a rectangular prism shape, among others. As will be appreciated by one of ordinary skill in the art, the number and spacing of rods 178 depends in part on the dimensions of the rod (e.g., the length and diameter). Projections 170, whether formed as fins 172, rods 178 or otherwise, may be secured to exterior surface 161 of evaporator coil 160 via various fastening methods. In some embodiments, projections 170 may be permanently secured to evaporator coil 160, and projections 170 may be welded or bonded to evaporator coil 160, or may be secured via brazing. However, projections 170 may be secured to evaporator coil 160 by via brackets, mechanical fasteners, or adhesives, among other fastening methods.

Projections 170 may be formed from a material having a high thermal conductivity. Projections 170 may be formed from the same material as evaporator coil 160. For example, in embodiments in which evaporator coil 160 is formed from copper, projections 170 may also be formed from copper. As heat exchange fluid freezes around windings 162 of evaporator coil 160, heat exchange fluid may also freeze around projections 170. As a result, a surface area of the bank of frozen heat exchange fluid is increased due to the freezing of heat exchange fluid around projections 170.

In some embodiments, projections 170 may be formed from heat pipes. Heat pipes may serve to promote rapid formation of frozen heat exchange fluid on projections 170 as well as rapid heat transfer in proximity of chiller coil. A heat pipe may include a hollow tube defining an enclosed interior volume and a working fluid arranged within the interior volume configured to be a vapor and a liquid in the operating temperature range. The working fluid inside the heat pipe may be selected based on the range of operating temperatures, and may be for example, ammonia, alcohol, or water, among other suitable fluids. The heat pipe may be arranged in the same manner as rods 178, and thus may extend radially from an exterior surface of evaporator coil 160 into central volume 164 towards the chiller coil.

Figure 9:
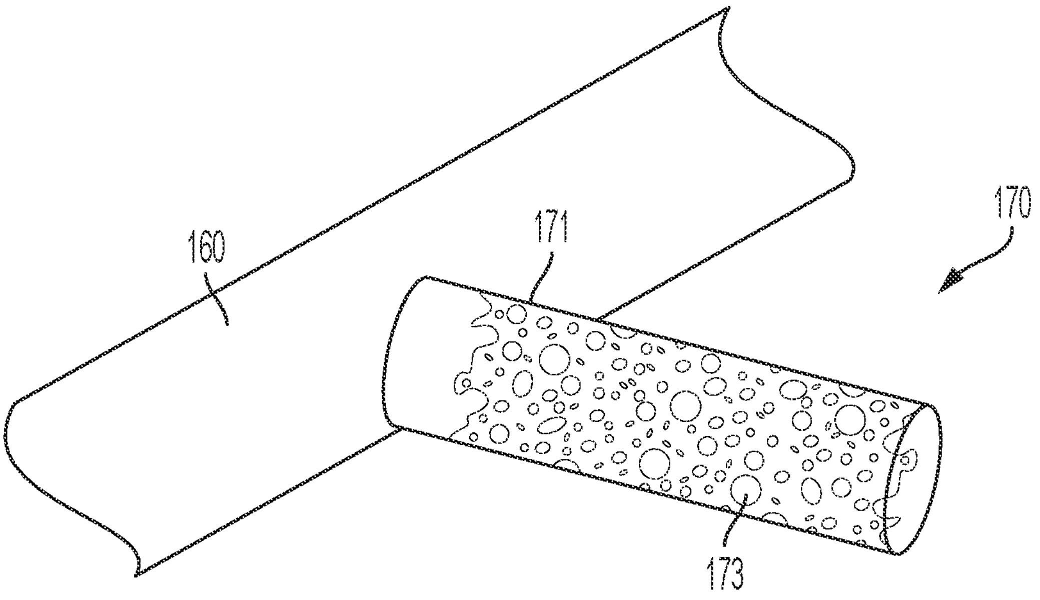
FIG. 9 shows a close-up view of a projection of an evaporator coil having a reticular structure according to an embodiment.

In some embodiments, projections 170 may be solid such that projections 170 have no openings that would allow heat exchange fluid to flow into or through projections 170. In some embodiments, projections 170 may have a reticular structure such the body 171 of projection 170 has a plurality of openings or pores 173, as shown for example in FIG. 9. In this way, heat exchange fluid 710 may flow into body 171 of projection 170 through pores 173. Pores 173 may be sufficiently large so that bank of frozen heat exchange fluid does not fully fill pores 173. The reticular structure may facilitate freezing of heat exchange fluid 710 to promote extension of bank 720 on and around projections 170. The reticular structure may also delay melting of bank 720. Reticular structure may increase the thermal conductivity of bank 720, and allows bank 720 to form more rapidly. The body 171 has a high thermal conductivity, driving heat exchange within bank 720. As discussed, projections 170 may be formed of a metal having a high thermal conductivity, such as copper. In some embodiments, to provide projections 170 with a reticular structure, projections 170 may be formed from a metal foam, such as a copper foam, among other materials. The reticular structure may have internal cells or pores, and the cells or pores may have a variety of sizes.

Figure 10:
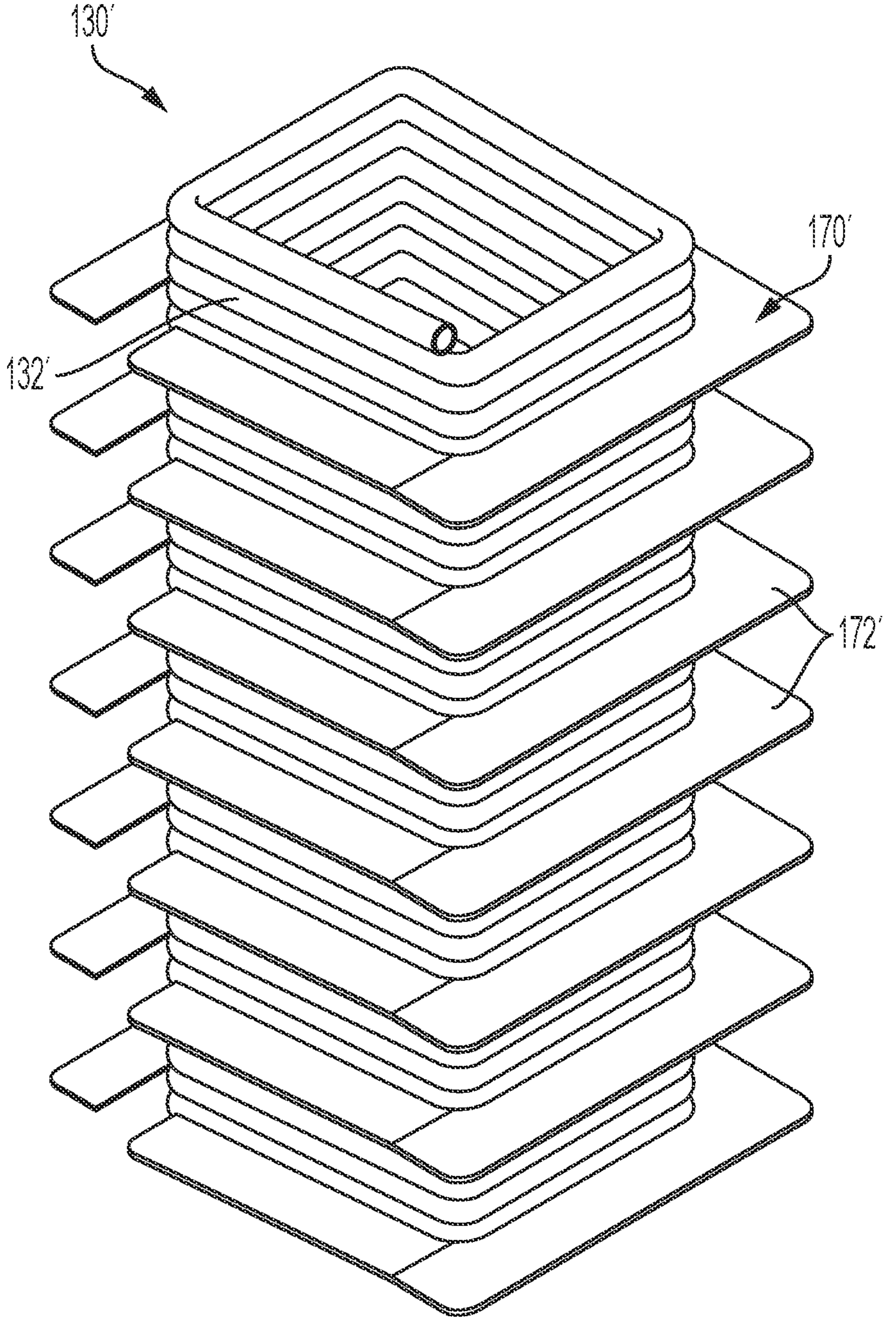
FIG. 10 shows a perspective view of a chiller coil having projections according to an embodiment.

In some embodiments, chiller coil 130' rather than evaporator coil may include projections 170', as shown for example in FIG. 10. In such embodiments, chiller coil 130' may include one or more projections having the same construction and features as described with respect to projections 170 of evaporator coil 160. In such embodiments, evaporator coil 160 may not have projections 170 in order to avoid growth of bank of frozen heat exchange fluid on projections of evaporator coil from growing onto projections of chiller coil 130'. Projections 170' of chiller coil 130' may extend outwardly from an exterior surface of one or more windings 132' of chiller coil 130', and may extend in a direction toward evaporator coil. Projections 170' on chiller coil 130' serve to promote conductive heat transfer. While heat exchange fluid may circulate to transfer heat from chiller coil 130' to bank of heat exchange fluid, conductive heat transfer through projections 170' may transfer heat more rapidly than convective heat transfer through heat exchange fluid. Further, projections 170' may also increase a surface area available for heat transfer.

In some embodiments, as shown in FIG. 10, projections 170' on chiller coil 130' may include fins 172'. Fins 172' may have the same construction and features as described with respect to fins 172. Thus, fins 172' may extend from one or more windings 132' of chiller coil 130'. Fins 172' may be spaced from one another, and fins 172' may not be present on each winding 132'. Fins 172' may extend in a plane of windings 132' of chiller coil 130'. In some embodiments, projections 170' may alternately include rods as described with respect to rods 178 of evaporator coil 160, and may have a reticular structure or foam. Further, projections 170' of chiller coil 130' may form a lattice structure as described in further detail herein.

Figure 11:
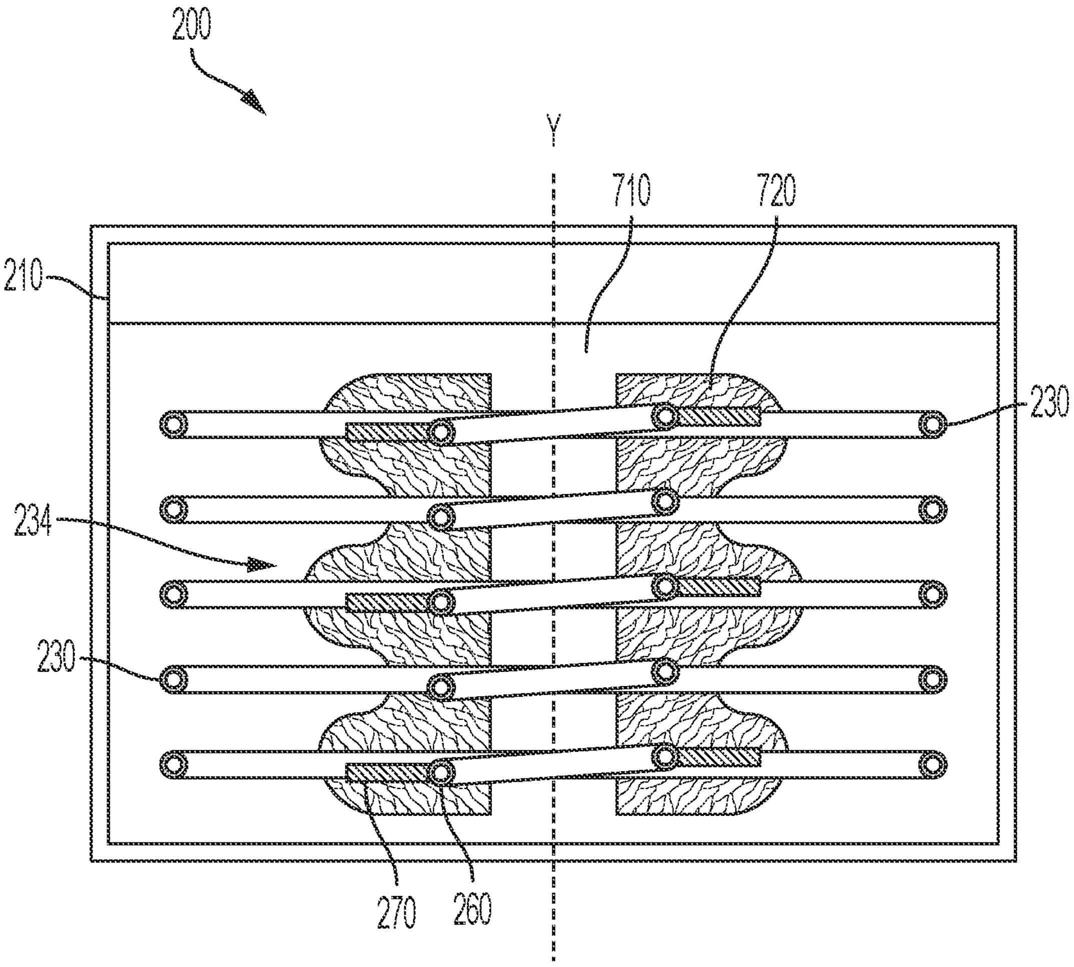
FIG. 11 shows a schematic cross sectional view of a chiller according to an embodiment.

In some embodiments, a chiller 200 may be formed as shown in FIG. 11. Chiller 200 is similar to chiller 100 of FIG. 1 and includes a reservoir 210 configured to hold a heat exchange fluid 710, an evaporator coil 260 for circulating a coolant that is arranged within reservoir 210, and a chiller coil 230 through which the beverage flows and that is also arranged within reservoir 210. However, chiller 200 differs from chiller 100 in that chiller coil 230 defines a central volume 234, and evaporator coil 260 is arranged within central volume 234 of chiller coil 230. Thus, the locations of the chiller coil 230 and evaporator coil 260 are switched relative to chiller 100. Chiller coil 230 at least partially surrounds evaporator coil 260. Evaporator coil 260 may be wound around the same axis Y as chiller coil 230. Evaporator coil 260 and chiller coil 230 may be arranged concentrically.

Chiller coil 230 of chiller 200 may follow a perimeter of reservoir 210. As a result, the length of chiller coil 230 within reservoir 210 may be longer relative to chiller coil 130 of chiller 100. Thus, chiller 200 may have the same footprint as chiller 100 while allowing a greater volume of beverage to be cooled by chiller 200 at a given time. Further, bank 720 formed on evaporator coil 260 may be more compact in chiller 200. Bank 720 formed on evaporator coil 260 may maintain an open central area within evaporator coil 260 to allow heat exchange fluid to circulate within the central area of evaporator coil 260 and to provide space for an agitator.

Evaporator coil 260 of chiller 200 may include projections 270. Projections 270 may have the same arrangement, construction, and features as described above with respect to evaporator coil 160 and projections 170. However, as projections 270 extend from an exterior surface of evaporator coil 260 in a direction toward chiller coil 230, projections 270 extend outward from evaporator coil 260 toward chiller coil 230, whereas projections 170 of evaporator coil 160 of chiller 100 extend inward toward central volume 164 of evaporator coil 160.

Figure 12:
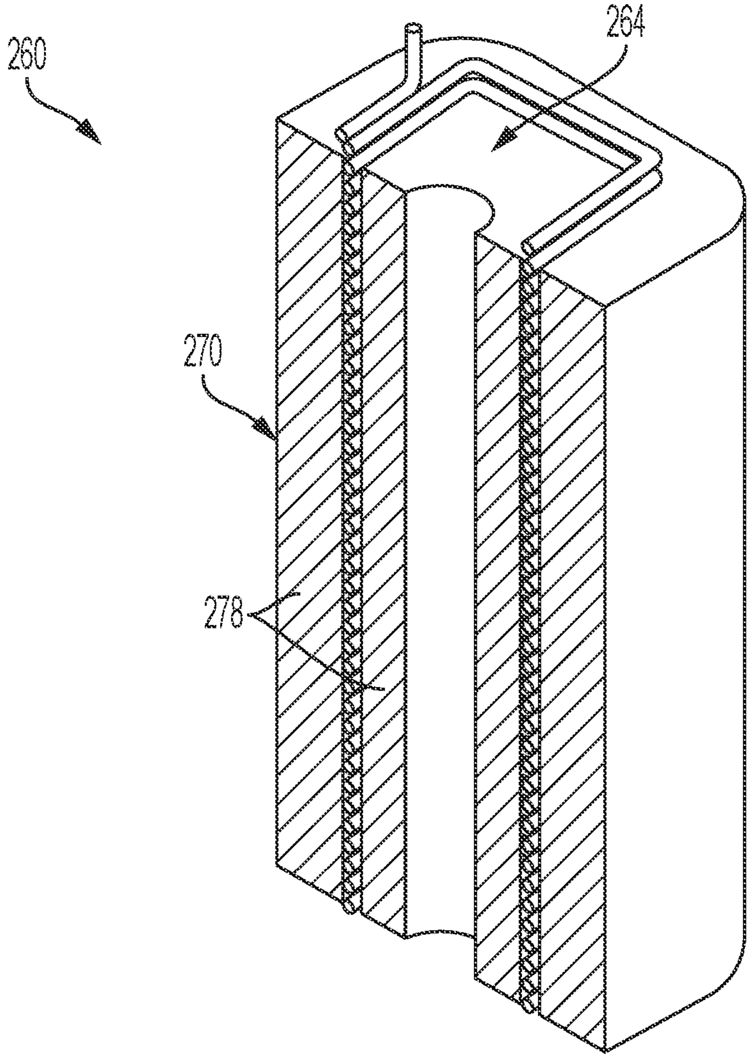
FIG. 12 shows a perspective view of an evaporator coil having projections with a reticular structure according to an embodiment for use with the chiller of FIG. 11.

In some embodiments, evaporator coil 260 of chiller 200 may include projections 270 that include a foam 278, as shown for example in FIG. 12. Foam 278 may extend from evaporator coil 260 toward central volume 264 of evaporator coil 260, away from central volume of evaporator coil 260, or both. Thus, foam 278 may be arranged on opposing sides of evaporator coil 260. Foam 278 may be porous and may have a reticular structure. Foam 278 may help to facilitate rapid formation of bank of frozen heat exchange fluid on evaporator coil 260 and on foam 278. In some embodiments, foam 278 may extend a full length of evaporator coil 260. However, in some embodiments, foam 278 may be arranged on only a portion of evaporator coil 260. In some embodiments, foam 278 may be made of the same material as evaporator coil 260, and in some embodiments, foam 278 may be a metal foam, such as a copper foam. However, in other embodiments, foam 278 may be made of non-metal materials, such as a paraffin, among others.

While exemplary chillers 100, 200 are described herein for the purposes of illustration, it is understood that other arrangements of an evaporator coil and one or more chiller coils within the reservoir of the chiller are possible. Further, it is understood that the heat exchange efficiency of any chiller having an evaporator coil may be improved by incorporating projections as described herein. In some embodiments, heat exchange efficiency of a chiller having a reservoir, an evaporator coil, and a chiller coil may be enhanced by attaching one or more projections as described herein to an exterior surface of the evaporator coil. In this way, when coolant is circulated through the evaporator coil, a bank of frozen heat exchange material, such as an ice bank, may rapidly form along the evaporator coil and also along the projections to increase the surface area of the bank and thus the interface of the heat exchange fluid in solid and liquid states. In some embodiments, heat transfer efficiency of a chiller having a reservoir, an evaporator coil, and a chiller coil may be enhanced by attaching projections as described herein to an exterior surface of the chiller coil. In this way, the projections provide conductive heat transfer and increase a surface area for heat transfer with chiller coil.

Figure 13:
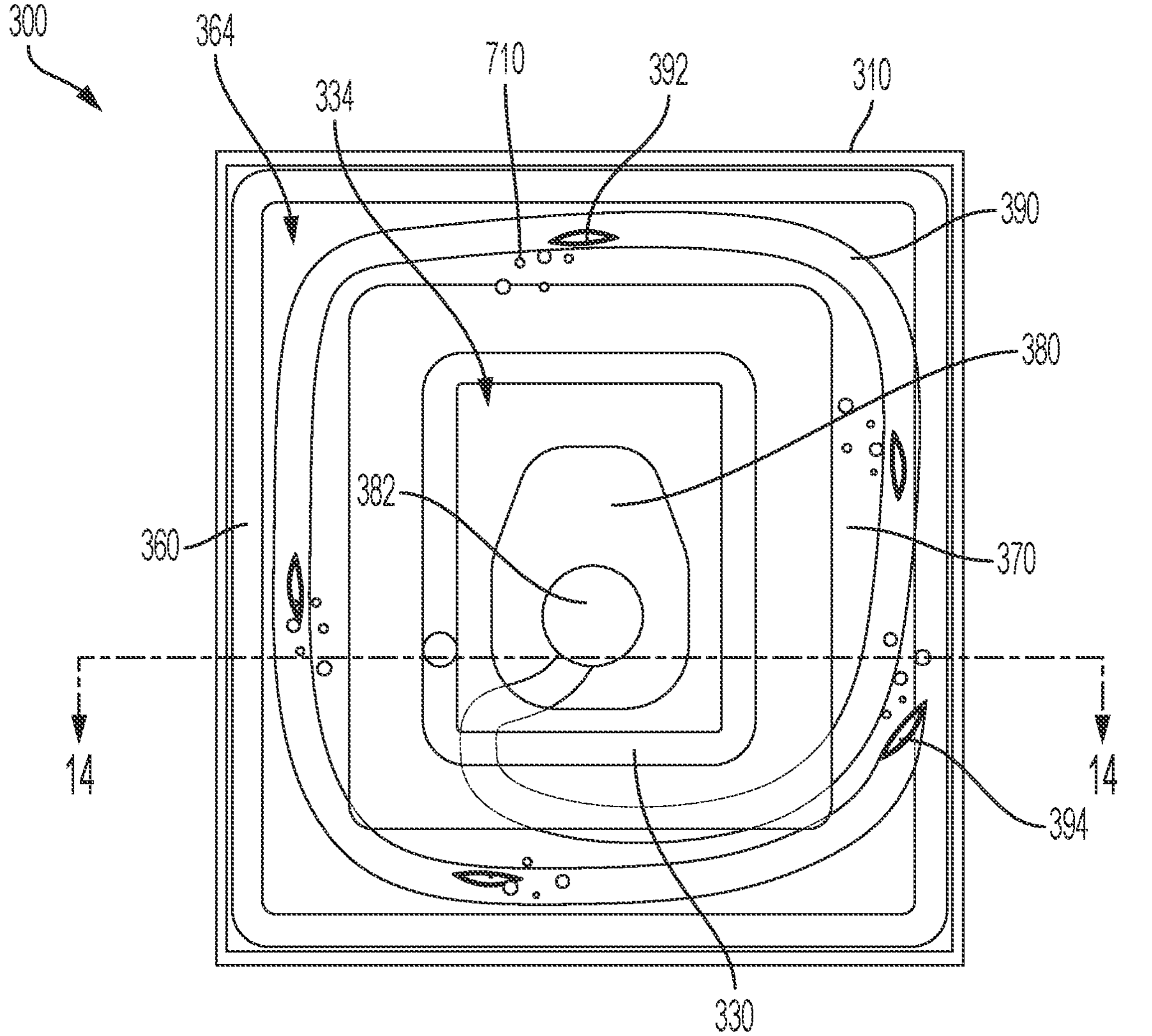
FIG. 13 shows a top-down view of a chiller having an agitator pump and a swirl tube according to an embodiment.
Figure 14:
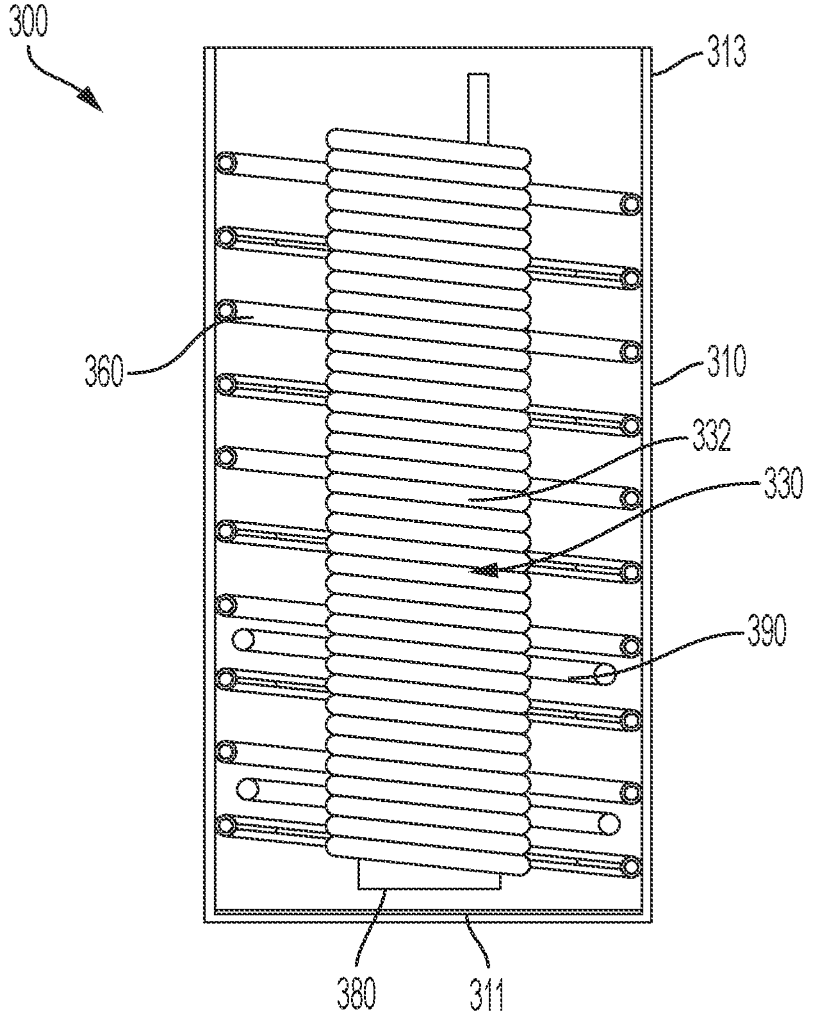
FIG. 14 shows a cross sectional view of the chiller of FIG. 13 as taken along line 14-14 in FIG. 13.

Some embodiments described herein relate to a chiller 300 having a swirl tube 390 configured to facilitate circulation of heat exchange fluid 710 within reservoir 310, as shown in FIGS. 13 and 14. Chiller 300 may have the same construction and features as described above with respect to chiller 100. Thus, chiller 300 may include a reservoir 310, an evaporator coil 360, and a chiller coil 330. Evaporator coil 360 may define a central volume 364 in which chiller coil 330 is arranged. Evaporator coil 360 may include projections 370 as discussed above with respect to projections 170 of evaporator coil 160.

Chiller 300 may further include a pump 380 configured to circulate heat exchange fluid within reservoir 310. Pump 380 may be submerged within the heat exchange fluid 710 in reservoir 310. In some embodiments, pump 380 may be arranged at a lower end 311 of reservoir 310. Pump 380 may include an intake 382 configured to draw heat exchange fluid 710 from reservoir 310 into pump 380. Pump 380 and intake 382 of pump 380 may be arranged so as to draw heat exchange fluid 710 from a central volume 334 defined by chiller coil 330. Thus, pump 380 or intake 382 of pump 380 may be arranged within central volume 334 of chiller coil 330. Pump 380 may include one or more outlets for ejecting heat exchange fluid 710 so as to circulate heat exchange fluid 710. The outlets may be arranged so as to direct heat exchange fluid 710 in a lateral direction.

In some embodiments, a swirl tube 390 may be in communication with pump 380 and may extend from pump 380 into a space between chiller coil 330 and evaporator coil 360. Chiller coil 330 may be tightly wound so that there is limited space between windings 332 of chiller coil 330. As a result, heat exchange fluid 710 in central volume 334 of chiller coil 330 may not easily circulate within reservoir 310. This may inhibit heat transfer from heat exchange fluid 710 in central volume 334 to the bank of frozen heat exchange material formed on evaporator coil 360 and projections 370.

In some embodiments, pump 380 may be configured to draw heat exchange fluid 710 from central volume 334 and disperse heat exchange fluid 710 toward the bank of frozen heat exchange fluid via a swirl tube 390. Swirl tube 390 may include one or more windings. Swirl tube 390 may be composed of a flexible material. Windings of swirl tube 390 may be spaced to a greater extent than windings of chiller coil 330 or evaporator coil 360 so that swirl tube 390 does not impact circulation of heat exchange fluid 710 within reservoir 310. Swirl tube 390 may include one or more outlets 392. Swirl tube 390 may include an outlet 392 at a terminal end 394 of swirl tube 390. Additional outlets 392 may be arranged along a length of swirl tube 390. Each outlet 392 may be arranged so that heat exchange fluid that escapes outlet 392 is directed toward a projection 370 of evaporator coil 360. In this way, the relatively warm heat exchange fluid from central volume 334 of chiller coil 330 is directed to the bank of frozen heat exchange fluid 710. This helps to induce turbulence and promote heat transfer and circulate heat exchange fluid 710 within reservoir 310. This may help to cool down the beverage faster at start-up and while beverage is being dispensed.

In some embodiments, as shown in FIG. 14, pump 380 may be arranged at lower end 311 of reservoir 310 and swirl tube 390 may extend from pump 380 toward an upper end 313 of reservoir 310. This may induce formation of a vortex within reservoir 310 as colder heat exchange fluid is at an upper end 313 of reservoir 310 and relatively warm heat exchange fluid is at lower end 311, causing heat exchange fluid 710 to circulate in a top-to-bottom manner. Beverage may enter chiller coil 330 at lower end 311 and may exit upper end 313 of chiller coil 330, generating a countercurrent heat exchange with the heat exchange fluid within reservoir 310. Countercurrent heat exchange may maximize the temperature change of the beverage within the chiller coil due to the maximization of the difference in temperature between the beverage in the chiller coil 330 and the heat exchange fluid in reservoir 310.

Figure 15:
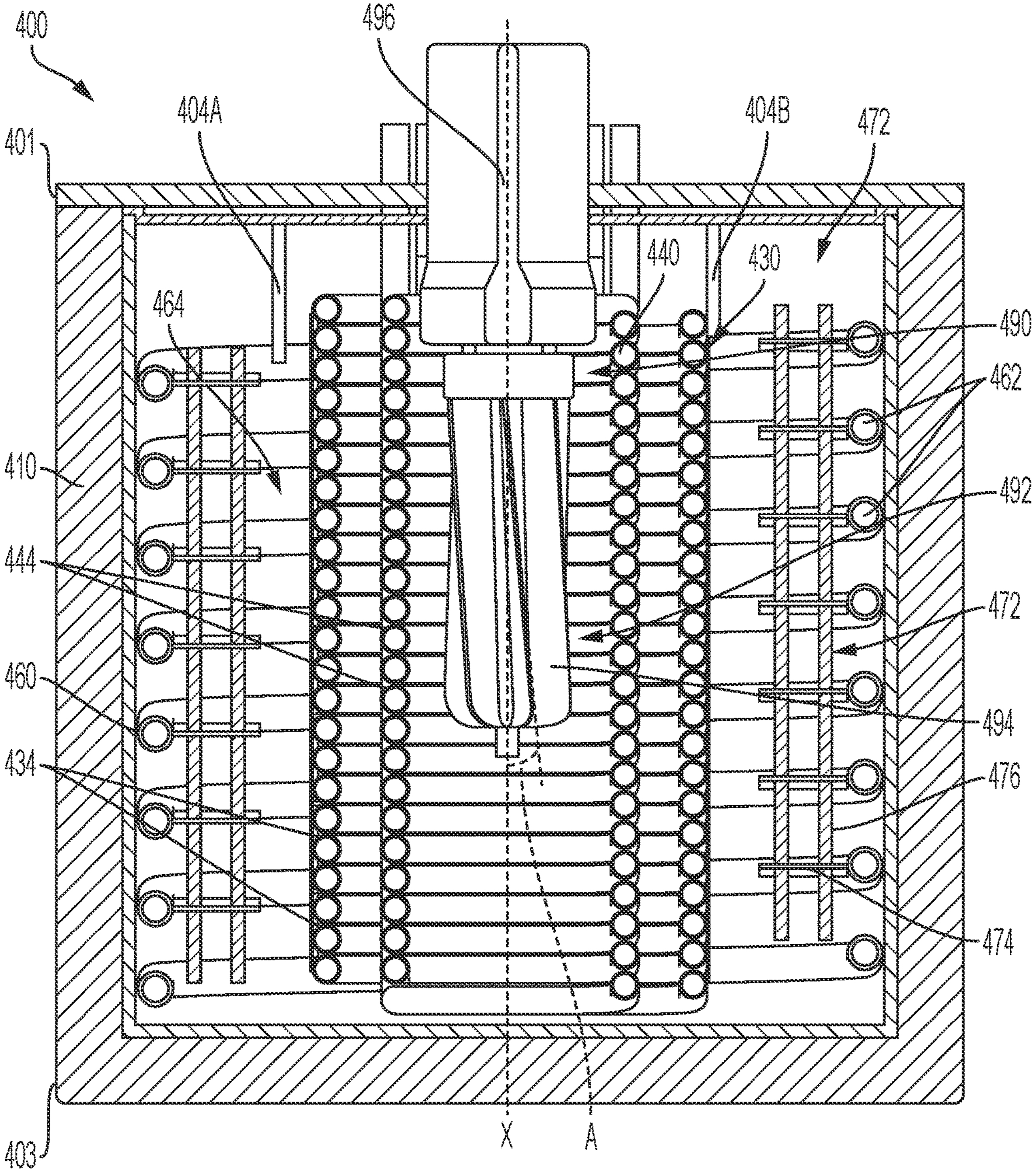
FIG. 15 shows a cross sectional view of a chiller according to an embodiment.
Figure 16:
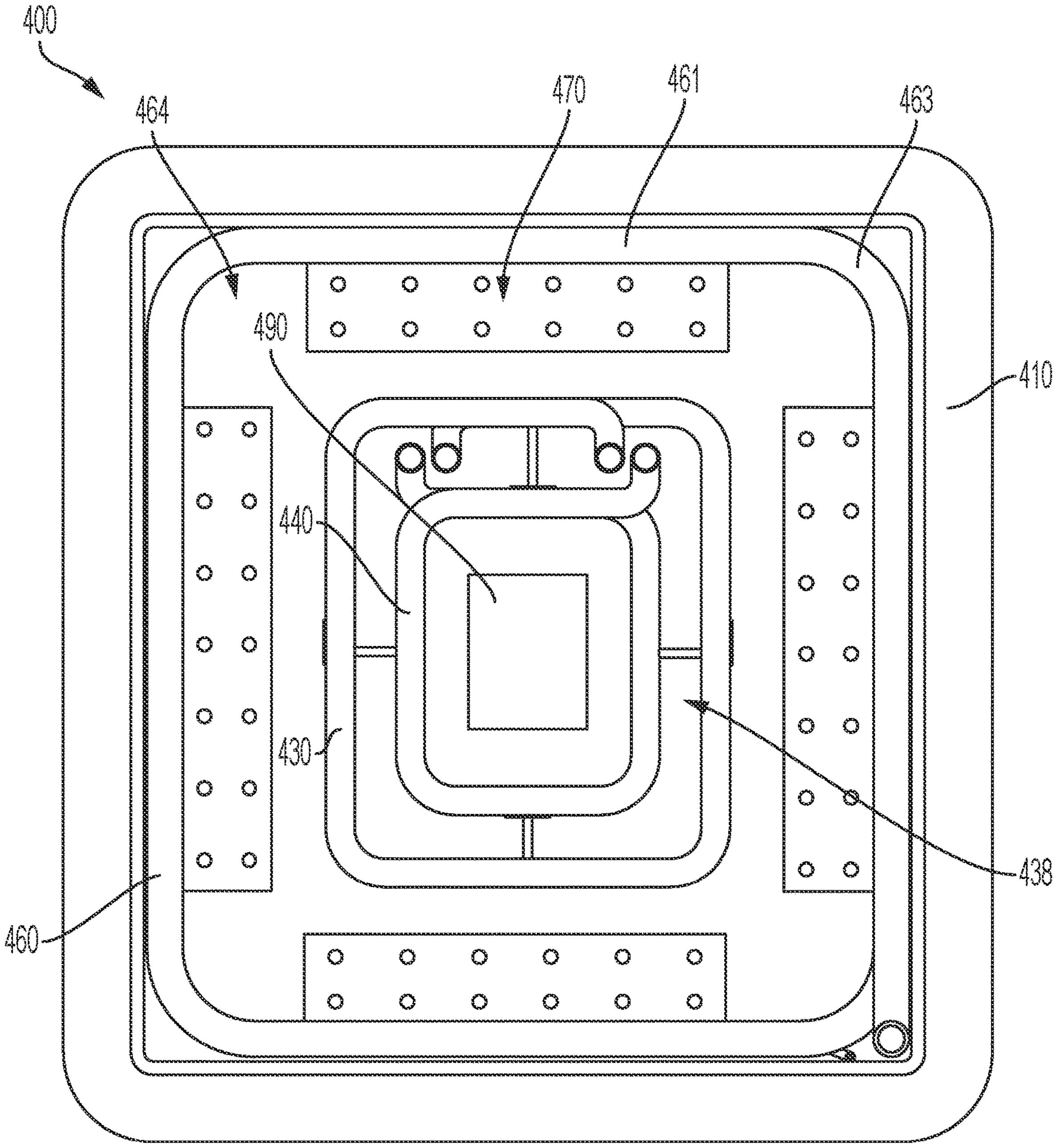
FIG. 16 shows a top-down view of the chiller of FIG. 15.

In some embodiments, a chiller 400 is shown for example at FIGS. 15-16. Chiller 400 may include the same construction and features as described with respect to chiller 100 except as noted herein. Similar to chiller 100, chiller 400 includes a reservoir 410 configured to contain a heat exchange fluid and an evaporator coil 460 arranged within reservoir 410 that is part of a cooling system for circulating a coolant. Further, chiller 400 includes a chiller coil 430 connected to a source of beverage and that is arranged within reservoir 410 within a central volume 464 of evaporator coil 460. Chiller coil 430 is configured to cool the beverage and communicate the cooled beverage to a dispenser. In some embodiments, chiller 400 further includes an agitator 490 configured to circulate heat exchange fluid within reservoir 410 and to optimize heat convection.

In some embodiments, evaporator coil 460 of chiller 400 may be a tube having a plurality of windings 462 through which a coolant may flow. Windings 462 may be arranged in a stacked configuration from a lower end of reservoir 410 toward an upper end of reservoir 410. Windings 462 may extend around a central axis X. In operation of chiller 400, windings 462 are submerged in the heat exchange fluid. Evaporator coil 460 may be arranged along a perimeter of reservoir 410. Thus, evaporator coil 460 may be arranged adjacent to and follow an interior wall of reservoir 410. Evaporator coil 460 may have a shape that corresponds to a shape of reservoir 410. For example, if reservoir 410 has a rectangular shape, evaporator coil 460 may similarly have a rectangular shape, as best shown in FIG. 16. In embodiments in which evaporator coil 460 has a rectangular shape, windings 462 of evaporator coil 460 may include linear portions 461 and curved portions 463 (see, e.g., FIG. 17).

Figure 17:
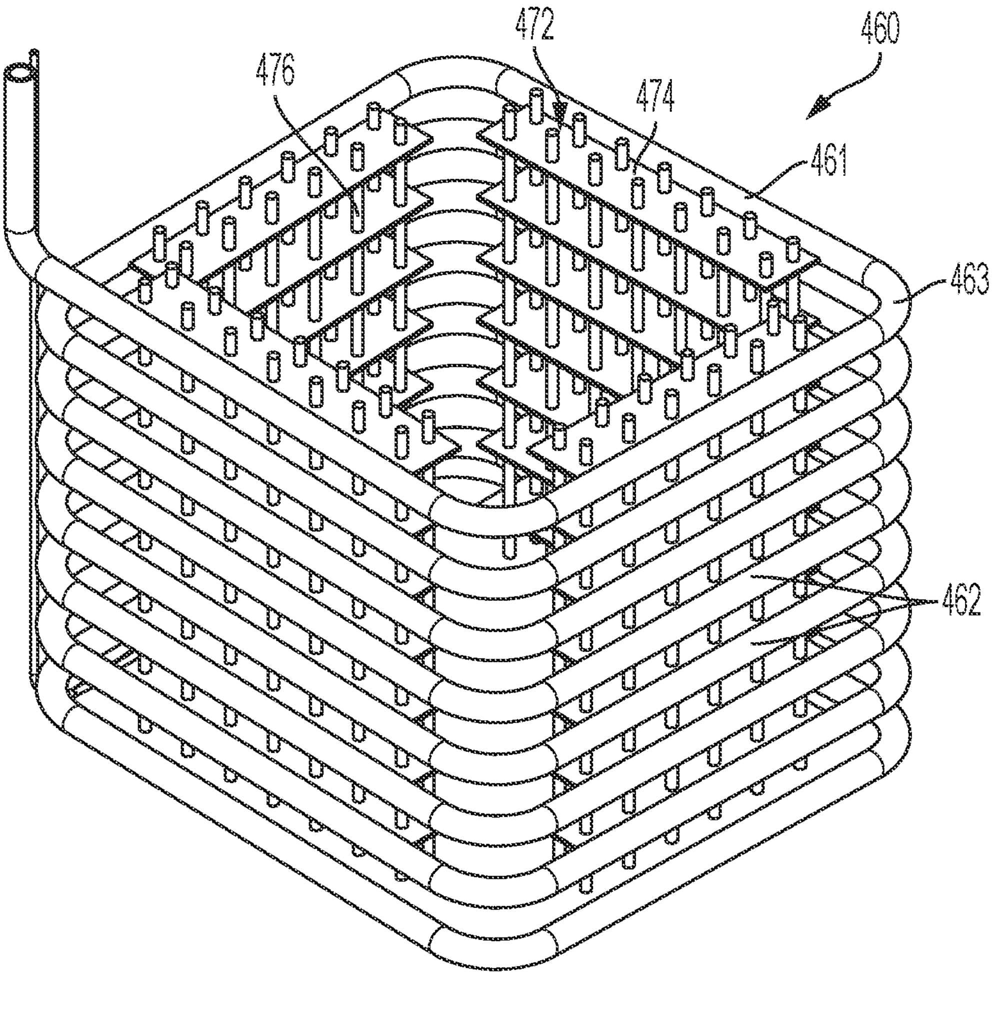
FIG. 17 shows a perspective view of an evaporator coil of the chiller of FIG. 15.
Figure 18:
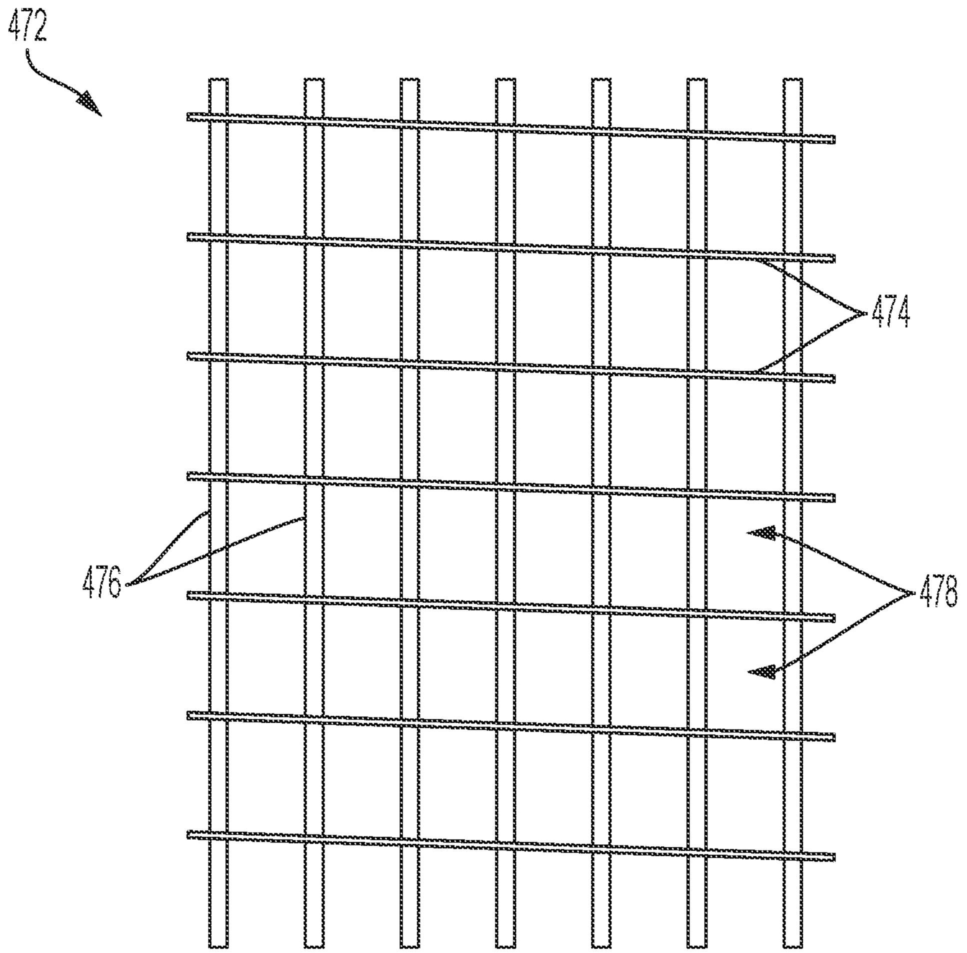
FIG. 18 shows a side view of the lattice structure of FIG. 17.

Evaporator coil 460 may further include projections 470 extending from an exterior surface of windings 462 of evaporator coil 460. In some embodiments, projections 470 may extend into central volume 464 defined by evaporator coil 460 and toward chiller coil 430. As shown in FIGS. 17-18, projections 470 may form a lattice structure 472. Lattice structure 472 may be a two-dimensional or three-dimensional lattice structure. In some embodiments, lattice structure 472 may include a plurality of fins 474. Fins 474 may be substantially planar and may have a generally rectangular shape. Fins 474 may extend along at least a portion of one or more winding 462 of evaporator coil 460, such as along linear portions 461 of evaporator coil 460. However, in some embodiments, fins 474 may be arranged along curved portions 463 of evaporator coil 460. Fins 474 may be arranged in a plane of windings 462. Fins 474 may be connected to one another by rods 476. Rods 476 may be arranged generally parallel to a central axis of evaporator coil 460. Further, rods 476 may be arranged generally perpendicularly to fins 474 and parallel to one another. Thus, fins 474 and rods 476 may form lattice structure 472 having a grid-like configuration that defines channels 478 or passages through which liquid heat exchange fluid may flow to contact frozen bank of heat exchange fluid formed on evaporator 460.

Fins 474 may be spaced from one another at a distance greater than a thickness of the bank of frozen heat exchange fluid to be formed on fins 474 so that bank does not completely fill space between fins 474 and liquid heat exchange fluid may flow in a space between adjacent fins 474. Similarly, rods 476 may be spaced from one another at a distance that is greater than a thickness of the bank of frozen heat exchange fluid to be formed on rods 476 so that bank does not completely fill space between rods 476 and liquid heat exchange fluid may between rods 476. If fins 474 or rods 476 are spaced too closely together, bank of frozen heat exchange fluid may leave little or no space through which heat exchange fluid may flow. In some embodiments, fins 474 may be spaced from one another by about 10 mm to about 30 mm, by about 12 mm to about 28 mm, or by about 15 mm to about 25 mm. In some embodiments, rods 476 may be spaced from one another by about 8 mm to about 24 mm, by about 10 mm to about 22 mm, or by about 12 mm to about 20 mm.

In some embodiments, lattice structure 472 including fins 474 and rods 476 may be formed as a unitary structure. Lattice structure 472 may be joined to windings 462 of evaporator coil 460 by welding or brazing, among other fastening methods. In some embodiments, lattice structure 472 may be formed of the same material as evaporator coil 460. In this way, heat transfer is the same in the material of evaporator coil 460 and lattice structure 472. In some embodiments, evaporator coil 460 and lattice structure 472 may include copper.

Without being desired to be bound by theory, the formation of bank of frozen heat exchange fluid, e.g., ice, on evaporator coil 460 will now be described. When chiller 400 is in use, coolant flows through windings 462 of evaporator coil 460 and evaporates at a predetermined temperature. The process of evaporation of the coolant absorbs a significant amount of heat from the heat exchange fluid and as a result a bank of frozen heat exchange fluid first begins to form around an exterior of windings 462 of evaporator coil 460. As material of lattice structure 472 is cooled, bank quickly continues to form along fins 474 of lattice structure 472. Bank may proceed to form along an external surface of rods 476 of lattice structure 472 extending between adjacent fins 474.

The resulting frozen bank of heat exchange fluid defines channels 478 through which liquid heat exchange fluid may flow. Lattice structure 472 serves to increase the surface area of the frozen bank of heat exchange fluid (relative to a bank of heat exchange fluid formed on windings of evaporator coil alone) in order to promote heat transfer from a beverage in chiller coil 430 through heat exchange fluid and to the frozen bank of heat exchange fluid. Further, lattice structure 472 provides sufficient space to allow liquid heat exchange fluid to flow through lattice structure 472 to contact bank of frozen heat exchange fluid.

Figure 19:
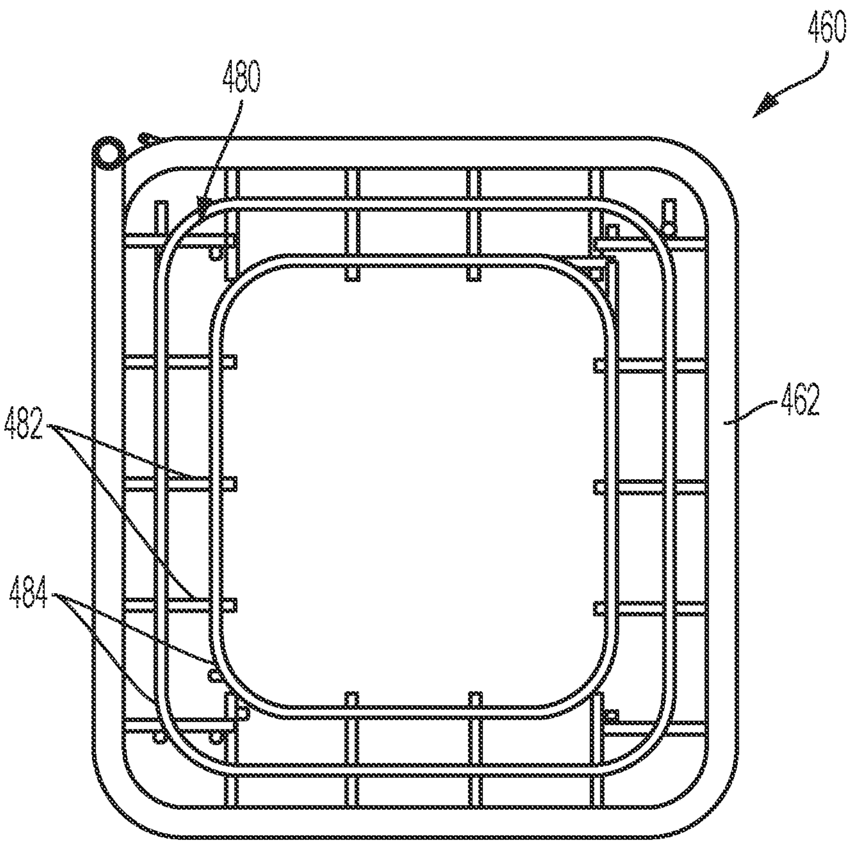
FIG. 19 shows a top-down view of an evaporator coil having a lattice structure according to an embodiment.
Figure 20:
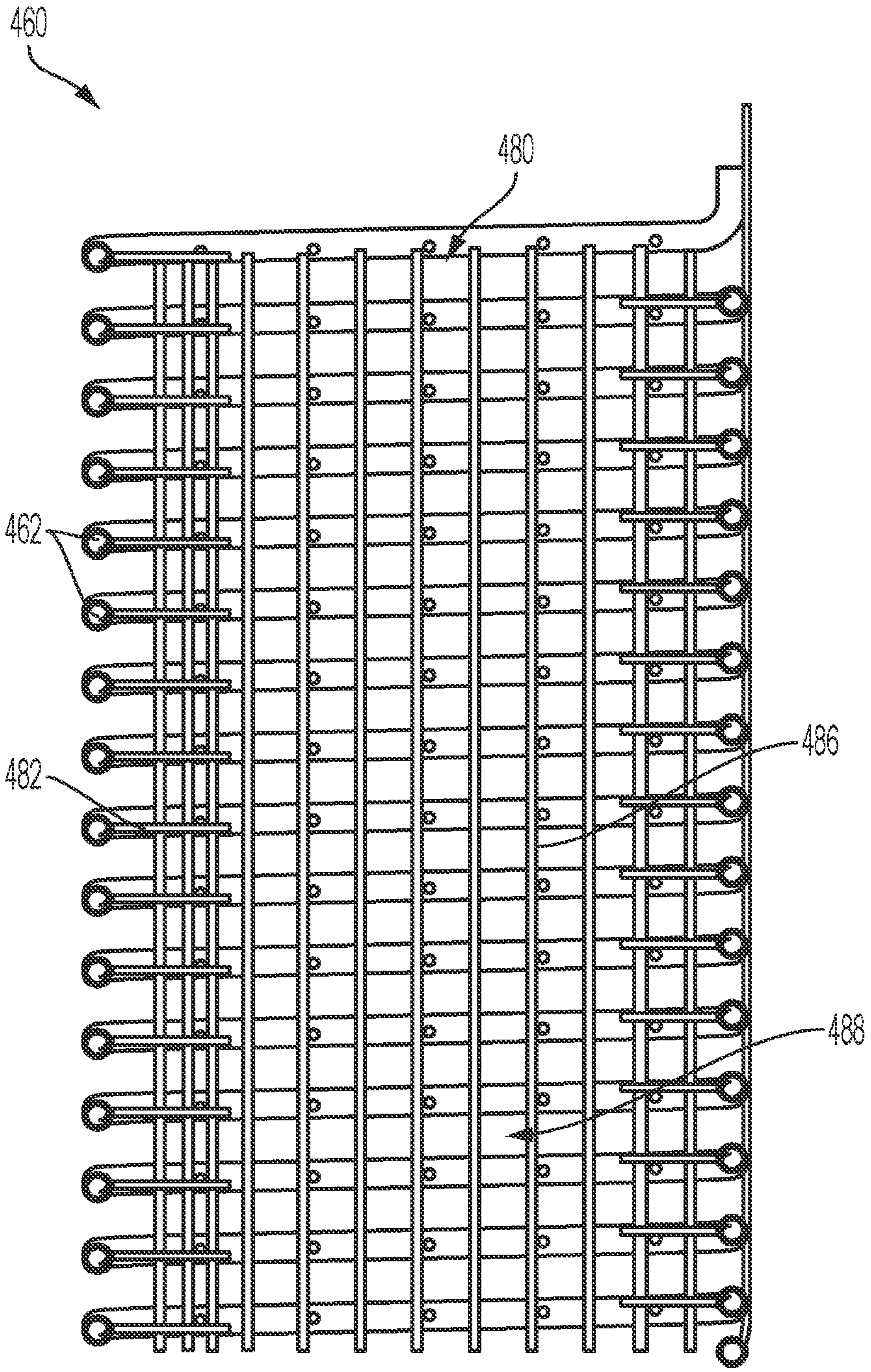
FIG. 20 shows a side sectional view of an evaporator coil having a lattice structure according to FIG. 19.

In some embodiments, lattice structure 480 may define cells 488, as shown for example in FIGS. 19-20. Lattice structure 480 may include first rods 482 extending outwardly from an exterior surface of one or more windings 462 of evaporator coil 460. First rods 482 may extend radially from evaporator coil 460 and may extend into central volume of evaporator coil 460 toward chiller coil. Second rods 484 may be arranged perpendicularly to first rods 482 and may be arranged parallel to or in a plane of windings 462. As shown in FIG. 19, second rods 484 may form one or more rings concentric with windings 462. Lattice structure 480 may further include third rods 486 that are parallel to a central axis of evaporator coil 460. Thus, cells 488 may be defined by first, second and third rods 482, 484, 486 and may be shaped as cubes or rectangular prisms with substantially open faces. Lattice structure 480 having cells 488 provides additional space for flow of liquid heat exchange fluid relative to lattice structure 472 having fins 474 and rods 476. However, lattice structure 480 may have somewhat less surface area than lattice structure 472 due to the use of first and second rods rather than fins 474.

In some embodiments, chiller 400 may include a plurality of chiller coils 430, 440 each having a plurality of windings 434, 444 arranged in reservoir 410. As shown in FIGS. 15-16, chiller 400 may include a first chiller coil 430 and additionally a second chiller coil 440. However, it is understood that chiller 400 may include fewer or additional chiller coils. The use of multiple chiller coils serves to increase the total volume of beverage that can be chilled by chiller 400 at a given time. However, the number of chiller coils is constrained by the available space within reservoir.

Chiller coils 430, 440 may be arranged in a central volume 464 defined by evaporator coil 460. In this way, evaporator coil 460 at least partially surrounds chiller coils 430, 440. Each chiller coil 430 may include a plurality of windings 434 arranged in a stacked configuration (see, e.g., FIG. 21). Windings 434 may extend around a central axis, such as central axis of evaporator coil 460. In some embodiments, windings 434 of chiller coil 430 may be spaced from one another to allow heat exchange fluid to flow in spaces between adjacent in windings 434. In some embodiments, windings 434 may be spaced from one another in a direction of central axis by about 0.1 mm to about 1 mm. In some embodiments, windings 434 may be spaced by about 0.5 mm. If the space between windings 434 is too small, chiller coil 430 may form a barrier inhibiting circulation of heat exchange fluid within reservoir 410. If the space between windings 434 increases, the number of windings 434 of chiller coil 430 that may fit within reservoir 410 is decreased, which is undesirable.

Figure 21:
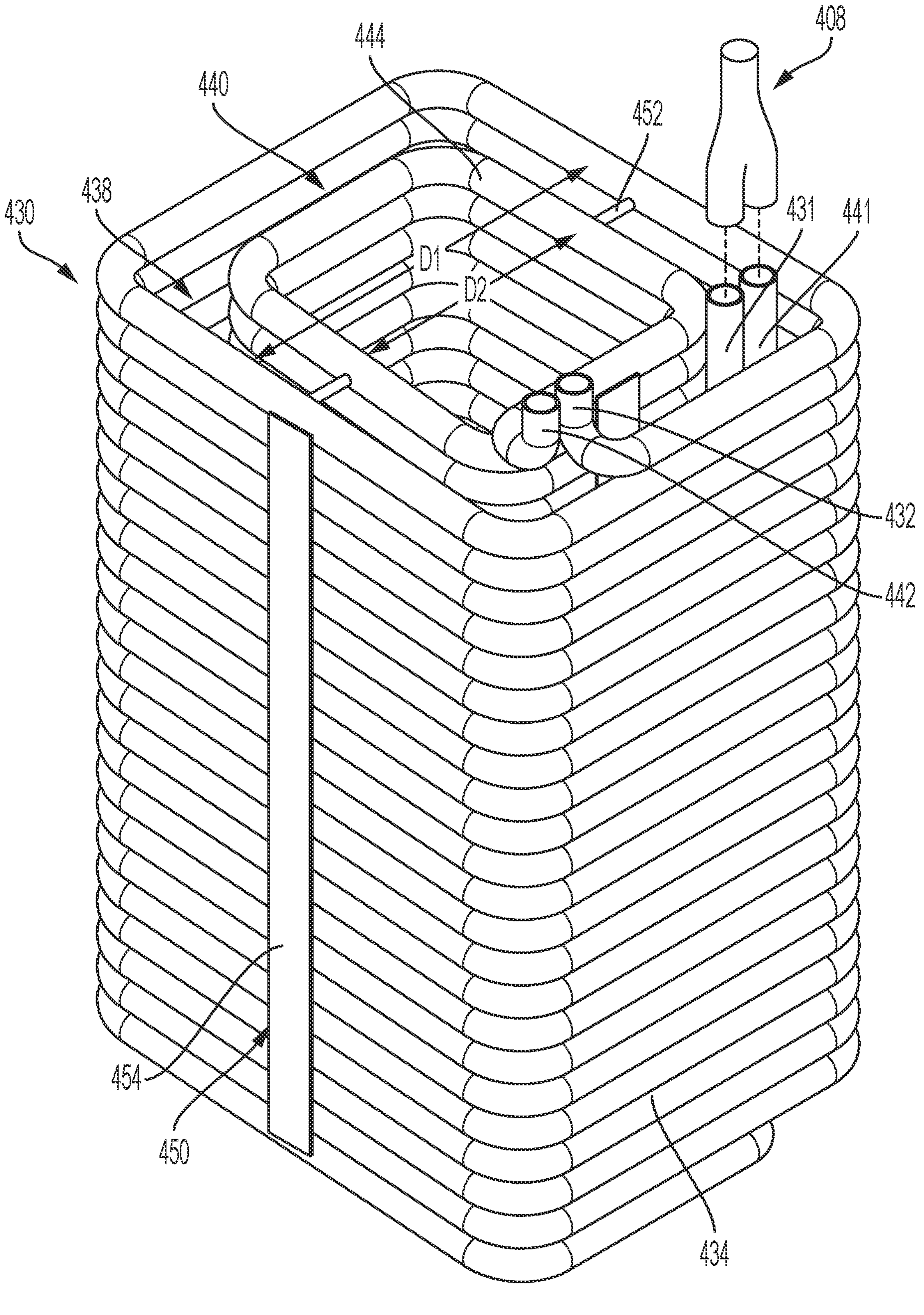
FIG. 21 shows a perspective view of the chiller coils of the chiller of FIG. 15.

In some embodiments, chiller coils 430, 440 may be arranged in a nested configuration, as shown in FIG. 21. In some embodiments, second chiller coil 440 may be arranged within a central volume defined by first chiller coil 430. Thus, first chiller coil 430 may have a first diameter $D_1$ and second chiller coil 440 may have a second diameter $D_2$ that is smaller than the first diameter $D_1$. Second chiller coil 440 may be separated from first chiller coil 430 by a gap 438. In some embodiments, gap 438 may provide space for liquid heat exchange fluid to flow between chiller coils 430, 440 to facilitate heat transfer.

In some embodiments, a total length of chiller coils 430, 440 in chiller 400 may be about 8 meters to about 18 meters, about 10 meters to about 16 meters, or about 12 meters to about 14 meters. Increasing the total length of chiller coil 430 in reservoir 410 increases the amount of beverage that can be cooled in a given time. Second chiller coil 440 may have a length that is smaller than that of the first chiller coil 430 as the second chiller coil 440 may have a smaller diameter than first chiller coil 430, as shown for example in FIG. 21. As the total length of the chiller coil 430 may increase as the volume of reservoir 410 increases, in some embodiments, a ratio of the total length of all chiller coil(s) (in meters) to a total volume of reservoir 410 (in Liters) may be in a range of about 2 meters/Liter to about 6 meters/Liter.

In some embodiments, first chiller coil 430 may include a first inlet 431 and a first outlet 432, and second chiller coil 440 may include a second inlet 441 and a second outlet 442. Thus, first and second chiller coils 430, 440 may define two separate flow paths through which a beverage may flow in order to be cooled by chiller 400. In such embodiments, chiller 400 may further include a splitter 408 configured to divide an incoming supply of beverage between chiller coils 430, 440. First chiller coil 430 may have a greater ability to transfer heat due to its closer proximity to evaporator coil 460 and longer total length relative to second chiller coil 440. As a result, splitter 408 may provide a greater portion of the incoming beverage to first chiller coil 430 than to second chiller coil 440. For example, splitter 408 may provide 60% or more, 65% or more, or 70% or more of the incoming flow of beverage to first chiller coil 430 and the remainder to second chiller coil 440. Splitter 408 may divide the flow of the beverage between the two chiller coils 430, 440 so that the temperature of the beverage at both outlets 432, 442 is substantially the same.

In some embodiments, first outlet 432 of first chiller coil 430 may be in communication with second inlet 441 of second chiller coil 440, or vice versa, so that chiller coils 430, 440 form one continuous flow path through which a beverage may flow. In such embodiments, the same quantity of beverage may be cooled at a given time as in embodiments having first and second chiller coils 430, 440 defining separate flow paths. However, the pressure drop over one long, continuous flow path may be relatively high in comparison to the pressure drop over two separate flow paths having the same length, which may require a stronger pump to circulate the beverage.

In some embodiments, chiller coils 430, 440 may include one or more connectors 450 configured to facilitate heat transfer and to maintain the spacing of the windings of chiller coils 430, 440. In some embodiments, connectors 450 may include first connectors 452 that connect first and second chiller coils 430, 440 to one another. First connectors 452 extend through gap 438 and may help to equalize heat transfer of first and second chiller coils 430, 440. As first chiller coil 430 is closer to evaporator coil 460, first chiller coil 430 may tend to have a lower temperature and first connector 452 provides conductive heat transfer between first and second chiller coils 430, 440. First connectors 452 may include a rod or plate having a first end connected to a first chiller coil 430 and a second end connected to second chiller coil 440. In some embodiments, a plurality of first connectors 452 may be arranged at upper end of chiller coils 430, 440 and a second plurality of first connectors 452 may be arranged at lower end of chiller coils 430, 440. First connectors 452 may be arranged in a plane that is generally transverse to a longitudinal axis of chiller 400. In some embodiments, first connectors 452 may be the same material as chiller coils 430, 440, e.g., stainless steel. However, in some embodiments, first connectors 452 may be copper or another metal having a high thermal conductivity.

Further, in some embodiments, each chiller coil 430, 440 may include a second connector 454 that extends along an exterior surface of chiller coil 430, 440 in a direction parallel to a central axis of evaporator coil 460. Second connector 454 may help to equalize heat transfer among the different windings of the same chiller coil 430, 440. Further, second connector 454 may help to maintain spacing between adjacent windings 434, 444.

Chiller coils may be constructed to maximize heat transfer between the beverage within chiller coils and heat exchange fluid in reservoir 410. The rate at which heat is extracted from the beverage flowing through chiller coil 430 depends on several factors, including the material of chiller coil 430, an inner diameter of the coil 430, and a wall thickness of chiller coil 430. While it is understood that chiller 400 may have multiple chiller coils, for simplicity the following discussion will refer to a single chiller coil 430.

In some embodiments, the chiller coil 430 may be formed of stainless steel, such as a 300-series or 400-series stainless steel. Stainless steel provides a high corrosion resistance and results in little to no contamination of the beverage in contact with chiller coil 430. Further, stainless steel has a relatively high thermal conductivity to facilitate transfer of heat through chiller coils.

Figure 22:
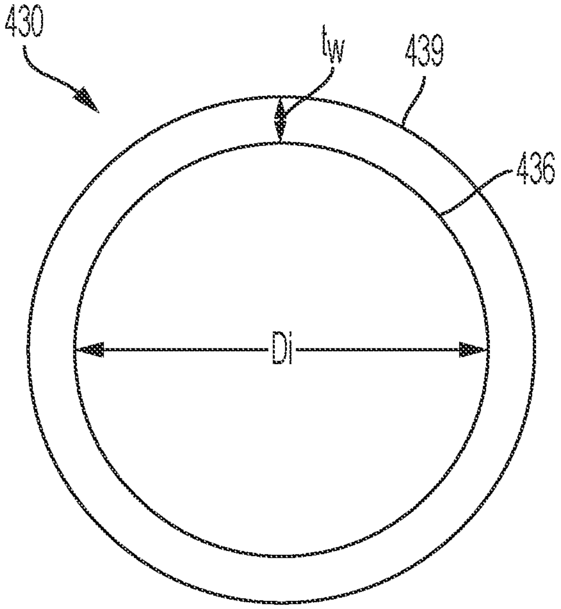
FIG. 22 shows a cross-sectional view of a chiller coil according to an embodiment.

A cross sectional area of a chiller coil 430 according to an embodiment is shown in FIG. 22. In some embodiments, chiller coil 430 may have a substantially circular cross sectional area. However, in some embodiments, chiller coil 430 may have an oval cross sectional area. A chiller coil 430 with an oval cross sectional area may have the highest heat transfer of any cross sectional shape. Further, the oval cross sectional shape allows a greater number of windings of chiller coil 430 to fit within reservoir 410 of chiller 400 due to the decreased height of the oval cross sectional area relative to a circular cross sectional area.

The wall thickness $t_w$ of each chiller coil 430 may be selected to facilitate transfer of heat from a beverage within chiller coil 430 to heat exchange fluid in reservoir 410. Wall thickness $t_w$ may be defined as the shortest distance in a radial direction from an inner surface 436 of chiller coil 430 to an exterior surface 439 of chiller coil 430, as shown in FIG. 22. Generally, conduits for circulating a beverage in a beverage dispenser have wall thickness of about 1 mm. In some embodiments, a wall thickness of chiller coil 430 may be in a range of 0.2 mm to 1.0 mm, and may be about 0.5 mm. As wall thickness increases, the rate of heat transfer decreases due to the additional material in the wall of chiller coil 430. Further decreasing wall thickness of chiller coil 430 below 0.2 mm may further increase the rate of heat transfer, but manufacturing chiller coil 430 with very thin wall thickness may become impractical, and chiller coil 430 having a very thin wall thickness may be fragile and susceptible to cracking when chiller coil 430 is being shaped to the desired configuration (e.g., a plurality of rectangular windings or circular windings). In some embodiments, chiller coil 430 having a circular cross sectional area may have a small inner diameter $D_i$ of about 4.5 mm to about 6.5 mm. As the inner diameter of chiller coil 430 decreases, the rate of heat transfer increases.

In some embodiments, chiller 400 may provide countercurrent heat exchange of beverage through chiller coil 430 in reservoir 410 to maximize the decrease in temperature of the beverage in chiller coil. In such embodiments, beverage may flow through chiller coil 430 from lower end toward an upper end of chiller coil 430. Thus, the beverage flows in a generally upward direction through chiller coil 430. Temperature of heat exchange fluid in reservoir 410 may be relatively low at upper end of reservoir 410 and relatively high at the lower end of reservoir 410. As a result, a flow of heat exchange fluid in reservoir may be from the upper end toward the lower end, resulting in countercurrent heat exchange with the beverage flowing through chiller coil 430.

In some embodiments, chiller 400 may include an agitator 490 configured to circulate liquid heat exchange fluid in reservoir 410, as best shown in FIGS. 15-16. As liquid heat exchange fluid adjacent bank is relatively cool and liquid heat exchange fluid adjacent chiller coil 430 is relatively warm, agitator 490 helps to circulate heat exchange fluid to enhance heat convection. Agitator 490 may be arranged along a central axis X of chiller 400. Agitator 490 may be arranged in a central volume defined by a chiller coil, such as by an innermost chiller coil of a plurality of chiller coils 440. In some embodiments, agitator 490 may be arranged to extend from upper end 401 of chiller 400 towards a lower end 403 of chiller 400. However, in some embodiments, agitator 490 may be arranged from lower end 403 of chiller 400 extending towards upper end 401. In some embodiments, agitator 490 may be submersible.

In some embodiments, agitator 490 may include an impeller 492 having one or more blades 494. Impeller 492 may be arranged to extend from upper end 401 toward lower end 403 of chiller 400. In some embodiments, impeller 492 may extend the full height of the reservoir 410. In some embodiments, blades 494 may be arranged at an angle A relative to a central axis X. The angle A determines the flow of heat exchange fluid within reservoir and the torque of the motor. In some embodiments, the angle A is about 15 to about 45 degrees, about 17 to about 35 degrees, or about 20 to about 30 degrees with respect to central axis X to maximize the flow of heat exchange fluid within the reservoir 410.

Agitator 490 may include a motor 496 configured to cause rotation of impeller 492. In operation of chiller 400, motor 496 may be submerged in liquid heat exchange fluid in reservoir 410. In some embodiments, agitator 490 may include a motor arranged exterior to reservoir 410 with an impeller 492 arranged within reservoir 410, such that motor 496 is not submerged in heat exchange fluid. Motor 496 may be a direct current (DC) motor. In some embodiments, motor 496 may be configured to rotate impeller 492 at a rate of 8,000 rpm or more, 9,000 rpm or more, or 10,000 rpm or more, and the rate of rotation of impeller 492 may be in the range of 9,000 to 12,000 rpm. Increasing the rotation rate allows the heat exchange fluid to reach a uniform temperature in a shorter period of time, on the order of a few seconds to facilitate heat transfer. Lower rotation rates may require a longer time to achieve uniform temperature of the heat exchange fluid, which may slow or delay heat transfer.

In some embodiments, operation of a chiller as described herein may be controlled based on one or more temperature sensors. Chiller may include a control unit that controls operation of chiller, and that controls operation of cooling system, agitator and other components, based on input from the temperature sensors. Operation of a cooling system and an agitator of a chiller based on readings from temperature sensors is described in U.S. application Ser. No. 16/875,975 (U.S. Publication No. 2020/0361758 A1), incorporated herein by reference in its entirety.

In some embodiments, temperature sensor 404 may include a thermistor, such as a negative temperature type thermistor (NTC). In some embodiments, a first temperature sensor (or sensors) 404A may be used to control operation of a compressor of a cooling system, and a second temperature sensor (or sensors) 404B may be used to control operation of agitator 490, as shown in FIG. 15. However, in some embodiments, chiller 400 may include only first temperature sensor(s) or only second temperature sensor(s). For example, in embodiments with no agitator, chiller may not include second temperature sensor used for controlling operation of agitator.

In some embodiments, a first temperature sensor 404A is used to control the thickness of the bank of frozen heat exchange fluid. The bank may continue to grow outward from evaporator and toward chiller coil. The cooling system is operated in order to prevent the bank of frozen heat exchange fluid from growing too close to chiller coil. When first temperature sensor 404A detects a temperature in a predetermined range of temperatures indicating the growth of the frozen bank of heat exchange fluid to a certain thickness, compressor may be deactivated to prevent further growth of frozen bank of heat exchange fluid. As discussed, if frozen bank continues to grow, frozen bank of heat exchange fluid may approach chiller coil resulting in freezing of the beverage within the chiller coil. First temperature sensor 404A may be placed a predetermined distance from evaporator coil 460 and when bank approaches temperature sensor, temperature sensor 404A may detect the low temperature and cause cooling system to deactivate and stop circulating coolant. The temperature sensor 404A may be arranged so that its outer facing surface that faces evaporator coil 460 is at the desired wall thickness for the bank. When bank contacts temperature sensor 404A, temperature sensor 404A may detect a temperature of 0° C. or below and may communicate with a control unit that deactivates cooling system 800.

Figure 23:
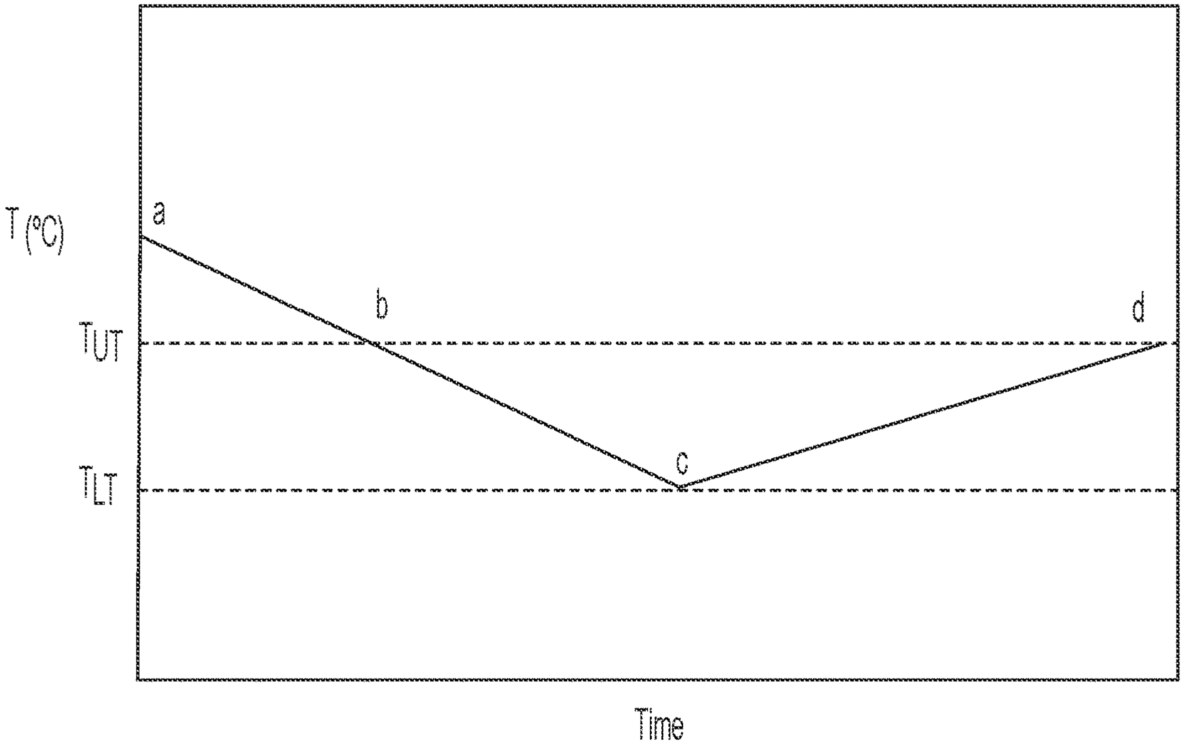
FIG. 23 shows a plot of the temperature of the heat exchange fluid in the chiller over time.

In some embodiments, cooling system operates within a predetermined temperature band having an upper threshold temperature $T_{UT}$ and a lower threshold temperature $T_{LT}$, as shown for example in FIG. 23. It is understood that FIG. 23 is provided for illustration of operation of cooling system and the change in temperature of heat exchange fluid may not be linear or constant over time. When the chiller is first started and the heat exchange fluid is at ambient temperature (point a), cooling system may activate to allow bank of frozen heat exchange fluid to form. As temperature decreases, the temperature may cross the upper threshold temperature into the predetermined temperature band (point b). The cooling system will continue to operate to facilitate ice formation. When the temperature reaches the lower threshold temperature (point c), which may be below 0° C., the cooling system may deactivate to stop further growth of the bank. As the temperature increases due to consumption or depletion of the bank of frozen heat exchange fluid, the cooling system will remain inactivate as temperature increases within the predetermined temperature band. When the temperature reaches the upper temperature threshold (point d), which may be around 0° C., the cooling system may activate again to begin restoring the bank of frozen heat exchange fluid. Further, the cooling system may be configured to remain activated or deactivated for a predetermined minimum time to prevent frequent activation and deactivation of the cooling system. In some embodiments, the predetermined minimum time is 1 minute to 5 minutes.

In some embodiments, chiller 400 may further include a second temperature sensor 404B configured to detect a temperature of beverage within chiller coil. Second temperature sensor may be arranged immediately adjacent exterior surface of chiller coil or may be in contact with exterior surface of chiller coil. Second temperature sensor 404B may detect a temperature of chiller coil and thus may be used to calculate a temperature of beverage within chiller coil 430. In embodiments having more than one chiller coil, second temperature sensor may be arranged adjacent the outermost chiller coil (the chiller coil positioned closest to the evaporator coil). However, in some embodiments, a sensor may be arranged within chiller coil 430 and in contact with beverage to determine a temperature of beverage. For example, sensor may include a fiber optic temperature sensor or a temperature probe that directly determines the temperature of the beverage at a specific location in chiller coil 430.

An agitator of chiller, such as agitator 490, may be configured to operate within a predetermined temperature band including an upper temperature threshold and a lower temperature threshold. Upon installation of chiller, chiller is filled with heat exchange fluid at ambient temperature. As evaporator coil 460 cools heat exchange fluid in reservoir 410 and bank of frozen heat exchange fluid begins to form around evaporator coil 460, agitator 490 is inactive. It is undesirable to activate agitator 490 as cooling system is operating and the temperature of the heat exchange fluid is decreasing from ambient temperature, as operation of the agitator 490 to circulate heat exchange fluid may disrupt or slow formation of frozen bank of heat exchange fluid around evaporator coil 460. However, as the temperature detected by second temperature sensor 404B falls below the upper threshold temperature, and the bank of frozen heat exchange fluid is formed, operating agitator 490 helps to circulate liquid heat exchange fluid to facilitate transfer of heat from chiller coil 430 to the bank in order to rapidly cool the beverage flowing through chiller coil 430. As the temperature detected by second temperature sensor 404B continues to decrease (i.e., as temperature of chiller coil 430 decreases), agitator 490 may be deactivated when second temperature sensor 404B detects a temperature at or below a lower threshold temperature. As temperature detected by second temperature sensor 404B reaches the lower threshold temperature, which may be in a range of about 0° C. to about 2° C., agitator 490 is deactivated (i.e., turned-off) to prevent unnecessary depletion of the bank of frozen heat exchange fluid. Further, reducing temperature below the lower threshold temperature may be inefficient and impractical and thus agitator 490 may be deactivated to conserve energy and eliminate heat transfer from agitator to heat exchange fluid. As temperature increases from lower threshold temperature within the predetermined temperature band, agitator 490 remains inactive until the upper threshold temperature is reached (e.g., about 1° C. to about 5° C.), at which point agitator 490 may again activate.

In some embodiments, agitator 490 may further begin operating based on detection of a presence of a user. In such embodiments, chiller 400 (or a beverage dispenser including chiller) may include a proximity sensor 498 configured to detect presence of a user or an object within a predetermined distance of chiller or beverage dispenser (see, e.g., FIG. 25). In some embodiments, the predetermined distance may be within 50 cm, within 30 cm, or within 10 cm of the chiller. Predetermined distance is selected to activate when a user that wishes to use chiller is present while avoiding activating when a person who does not wish to use chiller is passing by or is in the general area of chiller 400. In some embodiments, proximity sensor 498 is only activated if motion is detected for a minimum time period.

When proximity sensor 498 detects a user or object within the predetermined distance, indicating the presence of a user, agitator 490 of chiller 400 may activate for a first predetermined time. The first predetermined time may be in a range of 5 seconds to 60 seconds, 10 seconds to 40 seconds, or 20 seconds to 30 seconds. In this way, chiller 400 may begin to circulate heat exchange fluid within reservoir 410 in preparation for a user to dispense a beverage from chiller. Temperature sensors 404B may have a delay or latency in detecting temperature of chiller coil 430, and activation of chiller 400 based on the user's proximity helps to ensure agitator is activate when chiller 400 is in use to facilitate heat transfer. In the event the user does not dispense a beverage, the agitator 490 simply deactivates after the first predetermined time.

In some embodiments, if the user uses the chiller 400 to dispense a beverage, the agitator 490 may activate for a second predetermined time, such as about 30 seconds to about 150 seconds, about 50 seconds to about 130 seconds, or about 70 seconds to about 110 seconds. Once predetermined second time is complete, agitator 490 operates based on temperature sensor 404B as discussed above. Chiller 400 may activate agitator 490 for the second predetermined time anytime chiller is used to dispense a beverage. While the operating logic is discussed with respect to agitator 490, it is understood that the same operating logic may be applied with other types of agitators.

In some embodiments, a chiller as described herein may include a heat exchange fluid that is an ionic liquid. While it is desirable to have a bank of frozen heat exchange fluid that is as large as possible to promote heat transfer, the size of the bank of frozen heat exchange fluid may be limited by the dimensions of the reservoir and by the other components within the reservoir. As discussed, the bank of frozen heat exchange fluid may cause freezing of the beverage within the chiller coil if the bank is too close to the chiller coil.

Ionic liquids may be useful as heat exchange fluids in a chiller as ionic liquids may have a freezing point that is higher than that of water. As a result, the ionic liquid in the reservoir may freeze into a solid phase without freezing the beverage flowing through the chiller coil. As a result, substantially all of the heat exchange fluid in the reservoir may freeze and may be in a solid phase. The entire volume of reservoir may become a bank of frozen heat exchange fluid and the heat can be extracted during the change of phase of the bank at a constant temperature. As will be appreciated by one of ordinary skill in the art, conductive heat transfer may proceed much more efficiently in the solid phase rather than convective heat transfer through the liquid heat exchange fluid. Further, as the freezing point of the ionic liquid is higher than water, the bank may form more rapidly relative to water as the heat exchange fluid.

In some embodiments, ionic liquids may have a freezing point between about 0.01° C. and about 5° C. at atmospheric pressure so that the freezing point is above the freezing point of water to prevent freezing of the beverage within the chiller coil. The ionic liquid for use as a heat exchange fluid may have a high latent heat of fusion, and in some embodiments may have a latent heat of fusion in a range of 50 kJ/kg to 400 kJ/kg, 150 kJ/kg to 350 kJ/kg, or 200 kJ/kg to 300 kJ/kg. Further, the ionic liquid for use as a heat exchange fluid may have a low vapor tension, may be inert (non-flammable and not corrosive), may be recyclable or reusable, and may exhibit consistent physical and chemical properties over an extended period of time (such as one or more years) so that the performance of the heat exchange fluid does not degrade over time. In some embodiments, ionic liquids suitable for use as a heat exchange fluid for a chiller as described herein may be selected from 1-butyl-3-methylimidazolium ionic liquid, such as BMIM-NTF2 or BMIM-PF6, imidazolium based ionic liquids, pyridinium based ionic liquids, and morpholine based ionic liquids, and salts and combinations thereof.

Figure 24:
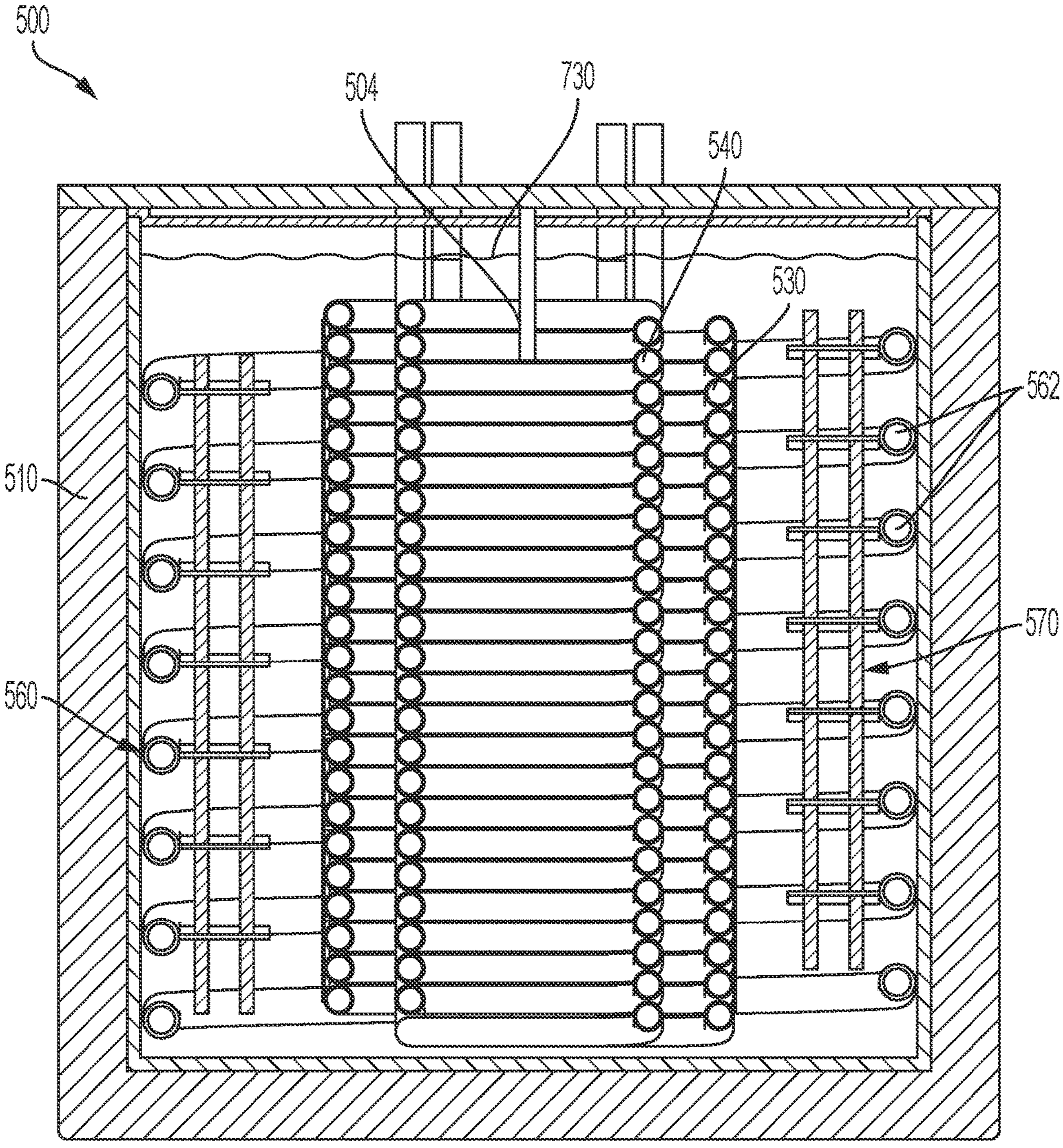
FIG. 24 shows a cross-sectional view of a chiller containing an ionic liquid heat exchange fluid according to an embodiment.

In some embodiments, chiller 500 includes a reservoir 510 containing a heat exchange fluid that is an ionic liquid 730, as shown in FIG. 24. Chiller 500 may be constructed as described above with respect to any of chillers 100, 200, 300, 400 except as noted herein. Thus, chiller 500 may include an evaporator coil 560 through which a coolant flows, and one or more chillers coils 530, 540 through which a beverage flows. Chiller 500 differs primarily in the use of an ionic liquid 730 as the heat exchange fluid. Further, the use of an ionic liquid 730 allows for chiller 500 to be manufactured without an agitator as described in further detail below. Further, chiller 500 may have a single temperature sensor 504 located along a central axis of chiller 500 that is configured to stop the cooling system from operating when all heat exchange fluid has frozen.

Reservoir 510 of chiller 500 may be sealed such that ionic liquid 730 is enclosed within reservoir 510 and is inaccessible to the end user. Thus, chiller 500 may be assembled, filled with ionic liquid 730, and sealed. This may help to prevent ionic liquid 730 from escaping during storage or transportation of chiller 500.

Evaporator coil 560 of chiller 500 may include projections 570 as described herein, for example, with respect to projections 170, 470. Projections 570 may help the ionic liquid to freeze into a solid phase more rapidly than in embodiments with no projections 570.

Further, chiller 500 does not include an agitator for circulating heat exchange fluid. As the ionic liquid 730 may be in a solid phase during operation of chiller 500, an agitator is not required to circulate a liquid phase heat exchange fluid to promote heat convection in the liquid phase so that ionic liquid changes phases as fast as possible. As a result, the construction of chiller 500 is simplified by elimination of the agitator (e.g., agitator 490) as well as a second temperature sensor (e.g., 404B). Further, as an agitator occupies space within reservoir, elimination of the agitator allows for a greater quantity of heat exchange fluid to be included in reservoir relative to embodiments of chiller having an agitator.

Additionally, the operating logic of chiller 500 is simplified when an ionic liquid is used as the heat exchange fluid. Chiller 500 does not require temperature sensors to monitor the growth of a bank of frozen heat exchange fluid as substantially all ionic liquid freezes into solid phase while the beverage continues to flow within the chiller coil(s) 530, 540 without risk of freezing. The mixture of ionic liquids as heat exchange fluid may be carefully selected so that its latent heat of melting in the entire volume of chiller 500 is greater that the latent heat of the ice bank, such as bank 720. Further, a temperature sensor (e.g., temperature sensor 404B) is not required to control operation of an agitator, as no agitator is present in chiller 500.

Figure 25:
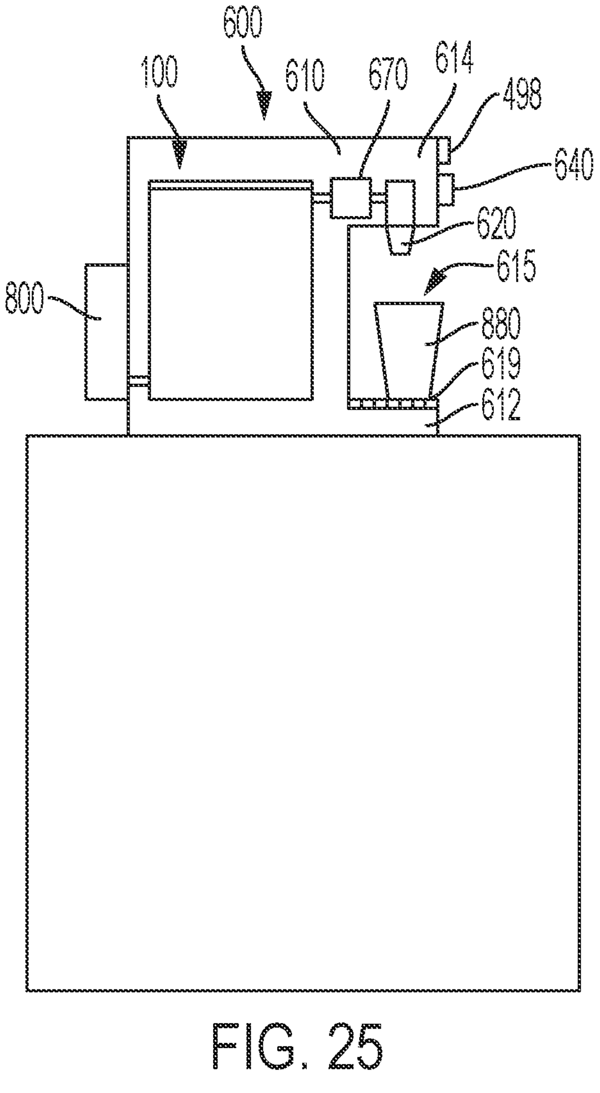
FIG. 25 shows a diagram of a beverage dispenser including a chiller according to an embodiment.

In some embodiments, a beverage dispenser 600 may include a chiller 100, 200, 300, 400, 500 as described herein. Beverage dispenser 600, as shown in FIG. 25, may include a housing 610 that encloses a chiller, such as chiller 100. Beverage dispenser 600 may have a compact configuration so that chiller 600 may be placed on a countertop, tabletop or the like, such as in a home kitchen or an office breakroom. Beverage dispenser 600 may be configured to dispense a base liquid, such as hot water, cold water, alkaline water, or sparkling water, and may be configured to dispense a flavoring in addition to the base liquid to provide a flavored beverage or a carbonated soft drink. A source of the base liquid 750 may be located remotely from beverage dispenser 600 (see, e.g., FIG. 26). Similarly, a source of flavoring 740 may be located remotely and provided to beverage dispenser 600 via a conduit, or one or more flavorings may be enclosed within housing 610 of beverage dispenser 600. Beverage dispenser 600 may further include a cooling system 800 for circulating a coolant through an evaporator coil 160 of chiller 100.

Housing 610 of beverage dispenser 600 may define a beverage container receiving area 615. Beverage dispenser 600 may include a nozzle 620 arranged on housing 610 at beverage container receiving area 615 for dispensing a beverage, such as a base liquid or a base liquid and a flavoring mixed together. Nozzle 620 may be arranged at an upper end 614 of housing 610 in beverage container receiving area 615. A container 880, such as a cup or bottle, may be placed in beverage container receiving area 615 to be filled with a beverage via nozzle 620. Container 880 may be placed on a lower end 612 of housing 610 in beverage container receiving area 615, which may include a drip tray 619 for collecting excess liquid from dispenser 105.

Figure 26:
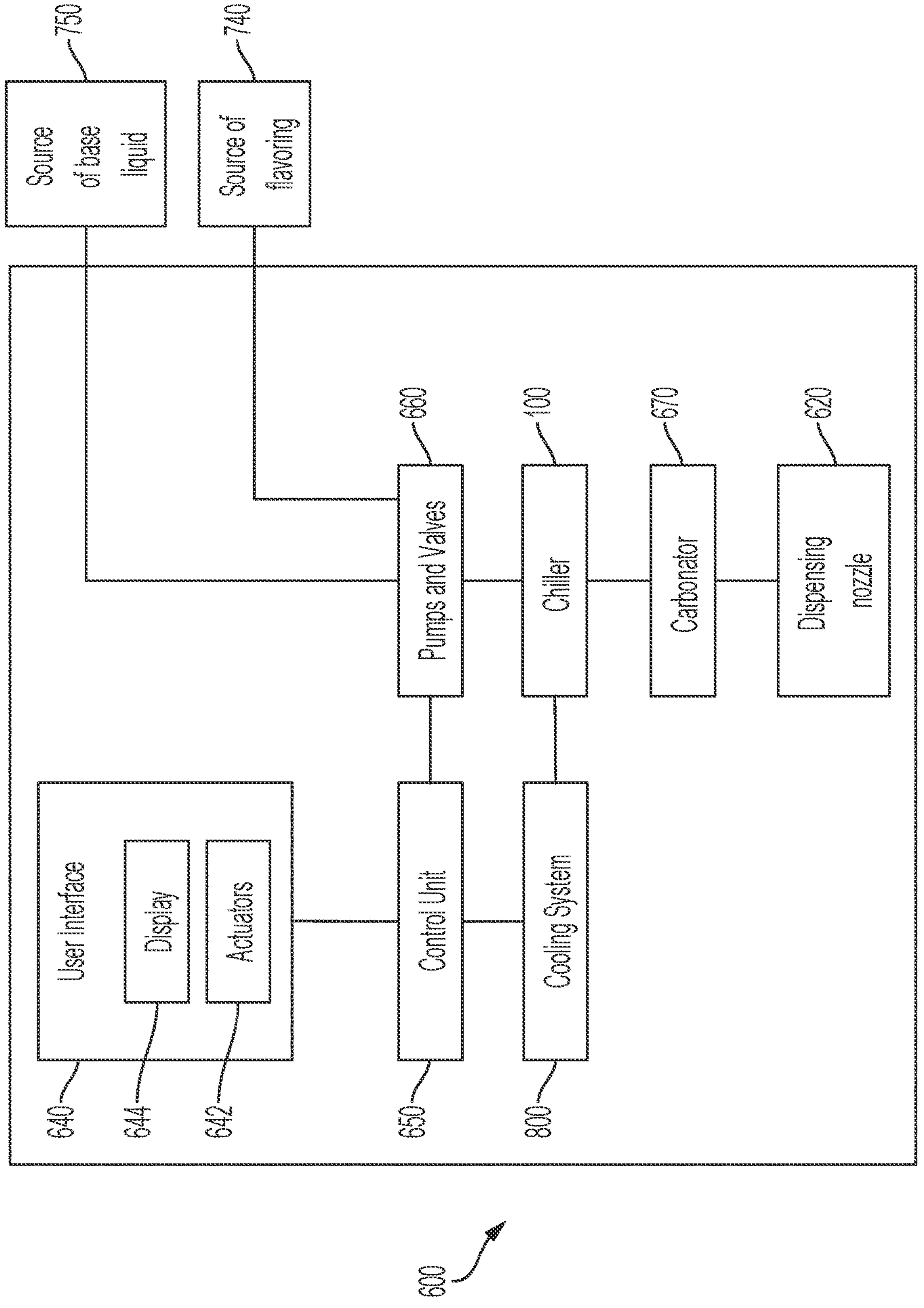
FIG. 26 shows a schematic diagram of components of a beverage dispenser according to an embodiment.

Housing 610 of beverage dispenser 600 may further include a user interface 640 for receiving a user input, as shown in FIG. 26. User interface 640 may include one or more actuators 642, such as buttons, switches, levers, knobs, dials, touch panels, touchscreens, or the like for receiving a user input. User input may include a beverage selection. In some embodiments, each beverage may have a separate actuator. In some embodiments, user interface 640 may alternatively or additionally include a display 644 for providing information to the user, such as instructions for operating beverage dispenser 600, a list of available beverages, or maintenance information. In some embodiments, display 644 may be a touch-screen display for receiving user input.

Beverage dispenser 600 may include a control unit 650 for controlling operation of beverage dispenser 600. Control unit 650 may be in communication with user interface 640, such that a user input received by user interface 640 is communicated to control unit 650, and control unit 650 may cause a beverage to be dispensed based on the user input, such as by actuating one or more pump and valves 660 for driving and controlling a flow of a base liquid and/or flavoring. In some embodiments, control unit 650 may further be in communication with cooling system 800 for circulating coolant. Control unit 650 may also be in communication with the chiller for implementing the operating logic for the chiller, such as by receiving input from temperature sensors and activating or deactivating the cooling system and agitator based on the input from the temperature sensors, as discussed herein.

In some embodiments, beverage dispenser 600 may include additional treatment units for treating the base liquid, such as a carbonator 670, an alkaline cartridge, a water filter, or a mixer for combining the base liquid with a flavoring. The treatment units may be arranged upstream or downstream of chiller 100. In some embodiments, a water filter may filter water prior to water being chilled by chiller 100. In some embodiments, carbonator 670 may arranged downstream of chiller such that water is chilled prior to being carbonated. In some embodiments, carbonator 670 may be located within chiller 100. In some embodiments, the chilled and carbonated water may then be mixed with flavorings to form a flavored beverage or carbonated soft drink in the dispensing nozzle or prior to reaching the dispensing nozzle. However, in some embodiments, water may be mixed with flavorings and then cooled by chiller 100 and subsequently carbonated.

Figure 27:
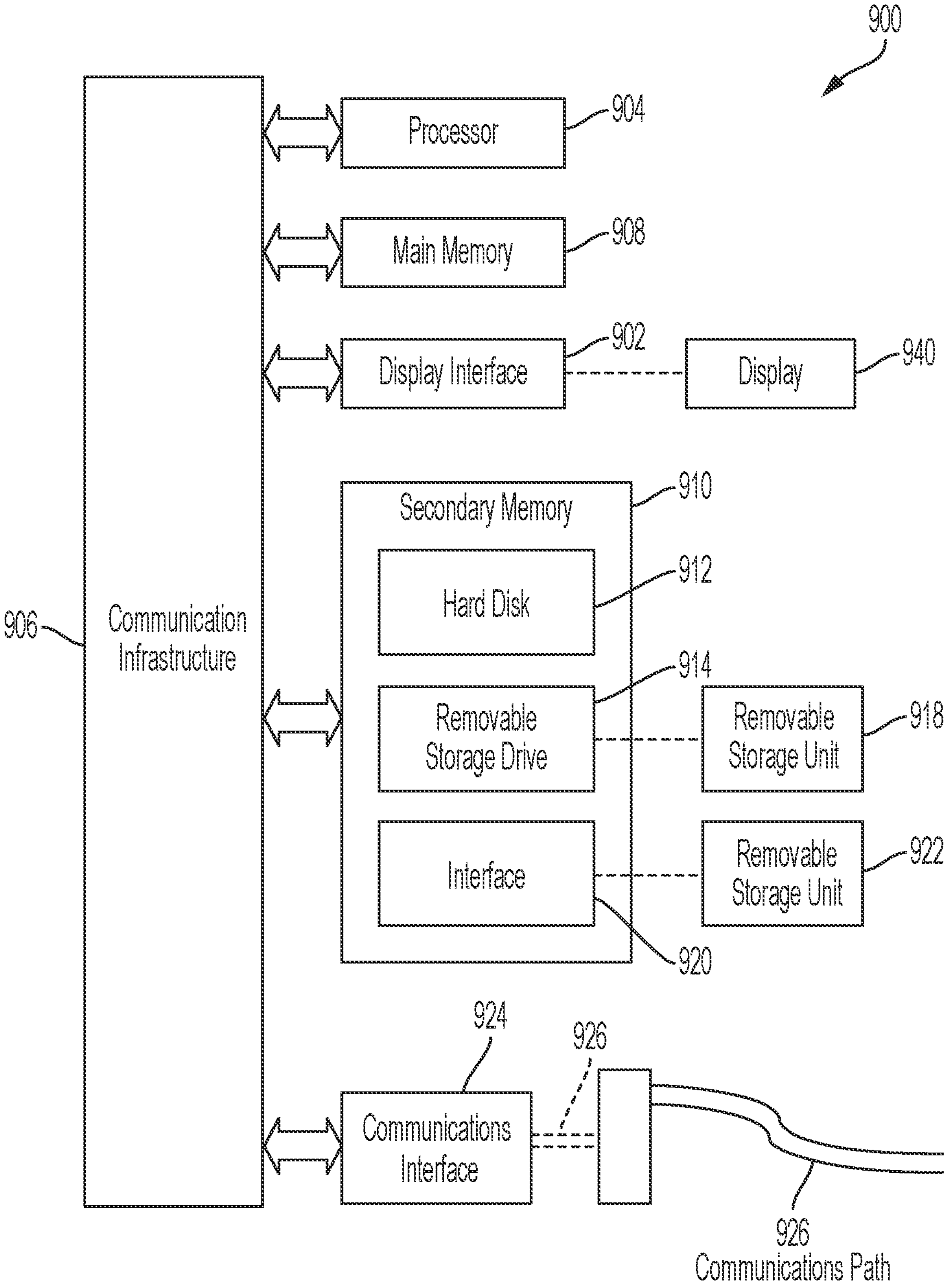
FIG. 27 shows a schematic block diagram of an exemplary computer system in which embodiments may be implemented.

FIG. 27 illustrates an exemplary computer system 900 in which embodiments, or portions thereof, may be implemented as computer-readable code. A control unit 650 as discussed herein may be a computer system having all or some of the components of computer system 900 for implementing processes discussed herein.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, and mainframe computers, computer linked or clustered with distributed functions, as well as pervasive or miniature computers that may be embedded into virtually any device.

For instance, at least one processor device and a memory may be used to implement the above described embodiments. A processor device may be a single processor, a plurality of processors, or combinations thereof. Processor devices may have one or more processor "cores."

Various embodiments may be implemented in terms of this example computer system 900. After reading this description, it will become apparent to a person skilled in the relevant art how to implement one or more of the invention (s) using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 904 may be a special purpose or a general purpose processor device. As will be appreciated by persons skilled in the relevant art, processor device 904 may also be a single processor in a multi-core/multiprocessor system, such system operating alone, or in a cluster of computing devices operating in a cluster or server farm. Processor device 904 is connected to a communication infrastructure 906, for example, a bus, message queue, network, or multi-core message-passing scheme.

Computer system 900 also includes a main memory 908, for example, random access memory (RAM), and may also include a secondary memory 910. Secondary memory 910 may include, for example, a hard disk drive 912, or removable storage drive 914. Removable storage drive 914 may include a floppy disk drive, a magnetic tape drive, an optical disk drive, a flash memory, or the like. The removable storage drive 914 reads from and/or writes to a removable storage unit 918 in a well-known manner. Removable storage unit 918 may include a floppy disk, magnetic tape, optical disk, a universal serial bus (USB) drive, etc. which is read by and written to by removable storage drive 914. As will be appreciated by persons skilled in the relevant art, removable storage unit 918 includes a computer usable storage medium having stored therein computer software and/or data.

Computer system 900 (optionally) includes a display interface 902 (which can include input and output devices such as keyboards, mice, etc.) that forwards graphics, text, and other data from communication infrastructure 906 (or from a frame buffer not shown) for display on display 940.

In alternative implementations, secondary memory 910 may include other similar means for allowing computer programs or other instructions to be loaded into computer system 900. Such means may include, for example, a removable storage unit 922 and an interface 920. Examples of such means may include a program cartridge and cartridge interface (such as that found in video game devices), a removable memory chip (such as an EPROM, or PROM) and associated socket, and other removable storage units 922 and interfaces 920 which allow software and data to be transferred from the removable storage unit 922 to computer system 900.

Computer system 900 may also include a communication interface 924. Communication interface 924 allows software and data to be transferred between computer system 900 and external devices. Communication interface 924 may include a modem, a network interface (such as an Ethernet card), a communication port, a PCMCIA slot and card, or the like. Software and data transferred via communication interface 924 may be in the form of signals, which may be electronic, electromagnetic, optical, or other signals capable of being received by communication interface 924. These signals may be provided to communication interface 924 via a communication path 926. Communication path 926 carries signals and may be implemented using wire or cable, fiber optics, a phone line, a cellular phone link, an RF link or other communication channels.

In this document, the terms "computer program medium" and "computer usable medium" are used to generally refer to media such as removable storage unit 918, removable storage unit 922, and a hard disk installed in hard disk drive 912. Computer program medium and computer usable medium may also refer to memories, such as main memory 908 and secondary memory 910, which may be memory semiconductors (e.g. DRAMs, etc.).

Computer programs (also called computer control logic) are stored in main memory 908 and/or secondary memory 910. Computer programs may also be received via communication interface 924. Such computer programs, when executed, enable computer system 900 to implement the embodiments as discussed herein. In particular, the computer programs, when executed, enable processor device 904 to implement the processes of the embodiments discussed here. Accordingly, such computer programs represent controllers of the computer system 900. Where the embodiments are implemented using software, the software may be stored in a computer program product and loaded into computer system 900 using removable storage drive 914, interface 920, and hard disk drive 912, or communication interface 924.

Embodiments of the invention(s) also may be directed to computer program products comprising software stored on any computer useable medium. Such software, when executed in one or more data processing device, causes a data processing device(s) to operate as described herein. Embodiments of the invention(s) may employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.).

It is to be appreciated that the Detailed Description section, and not the Summary and Abstract sections, is intended to be used to interpret the claims. The Summary and Abstract sections may set forth one or more but not all exemplary embodiments of the present invention(s) as contemplated by the inventors, and thus, are not intended to limit the present invention(s) and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention(s) that others can, by applying knowledge within the skill of the art, readily modify and/or adapt for various applications such specific embodiments, without undue experimentation, and without departing from the general concept of the present invention(s). Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance herein.

The breadth and scope of the present invention(s) should not be limited by any of the above-described exemplary embodiments, but should be defined only in accordance with the following claims and their equivalents.

What is claimed is:

1. A chiller for cooling a beverage, comprising:
- a reservoir configured to hold a heat exchange fluid;
- an evaporator coil arranged within the reservoir, the evaporator coil comprising:
  - a plurality of windings configured to circulate a coolant, and
  - projections extending from an exterior surface of one or more of the plurality of windings,
    - wherein the projections each comprise a body defining a plurality of pores configured to permit the heat exchange fluid to flow through the plurality of pores to facilitate formation of a bank of frozen heat exchange fluid on the windings and on the projections when the coolant is circulated through the plurality of windings; and
- a chiller coil comprising windings arranged in the reservoir, wherein the beverage is configured to flow through the windings of the chiller coil,
- wherein the windings of the chiller coil have a shape that corresponds to a shape of the reservoir, and
- wherein the projections extend toward and are spaced from the chiller coil by a distance.

2. The chiller of claim 1, wherein the projections comprise one or more fins.

3. The chiller of claim 1, wherein the projections comprise one or more rods.

4. The chiller of claim 1, wherein the projections comprise a lattice structure.

5. The chiller of claim 1, wherein the evaporator coil is formed from a first material, and wherein the projections are formed from a second material, and wherein the first material is the same as the second material.

6. The chiller of claim 1, wherein the evaporator coil defines a central volume, and wherein the chiller coil is arranged within the central volume of the evaporator coil.

7. The chiller of claim 1, further comprising a second chiller coil arranged in the reservoir, wherein the beverage is configured to flow through the first chiller coil and the second chiller coil.

8. The chiller of claim 7, further comprising a splitter configured to divide a flow of the beverage to the first chiller coil and to the second chiller coil, wherein the splitter divides the flow of the beverage such that a greater portion of the beverage flows to the first chiller coil than to the second chiller coil.

9. The chiller of claim 1, wherein a wall thickness of the chiller coil is in a range of about 0.2 mm to about 1.0 mm.

10. The chiller of claim 1, wherein the reservoir comprises a total volume of about 3 L to about 10 L.

11. The chiller of claim 1, further comprising an agitator arranged in the reservoir, wherein the agitator comprises an impeller having one or more blades.

12. The chiller of claim 11, further comprising a temperature sensor configured to determine a temperature of the chiller coil, wherein the agitator is configured to operate when a temperature of the chiller coil as detected by the temperature sensor is in a predetermined temperature band.

13. The chiller of claim 1, wherein the distance between the projections and the chiller coil is larger than a thickness of the bank of frozen heat exchange fluid.

14. A chiller for cooling a beverage, comprising:
- a reservoir configured to hold a heat exchange fluid;
- an evaporator coil arranged within the reservoir, the evaporator coil comprising:
  - a plurality of windings configured to circulate a coolant, and
  - projections extending from an exterior surface of one or more of the plurality of windings,
  - the projections each comprising a body defining a plurality of pores configured to permit the heat exchange fluid to flow through the plurality of pores to facilitate the formation of a bank of frozen heat exchange fluid on the windings and on the projections when the coolant is circulated through the plurality of windings; and
- a chiller coil arranged in the reservoir, wherein the beverage is configured to flow through the chiller coil.

15. The chiller of claim 14, wherein the projections extend from the evaporator coil in a direction toward the chiller coil and are spaced from the chiller coil by a distance.

16. The chiller of claim 14, wherein the projections extend from an exterior surface of a first side of the one or more of the plurality of windings.

* * * * *